US012776077B2

(12) United States Patent
Yoon et al.

(10) Patent No.: US 12,776,077 B2
(45) Date of Patent: Oct. 27, 2026

(54) GENERATIVE PORTRAIT SHADOW REMOVAL

(71) Applicant: Adobe Inc., San Jose, CA (US)

(72) Inventors: Jae Shin Yoon, San Jose, CA (US); Zhixin Shu, San Jose, CA (US); Yannick Hold-Geoffroy, Quebec City (CA); Xuaner Zhang, San Jose, CA (US); Srujani Kamineni, San Francisco, CA (US); Mengwei Ren, San Jose, CA (US); Krishna Kumar Singh, San Jose, CA (US); He Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 201 days.

(21) Appl. No.: 18/886,722

(22) Filed: Sep. 16, 2024

(65) Prior Publication Data

US 2026/0080578 A1 Mar. 19, 2026

(51) Int. Cl.

| | |
|---|---|
| ***G06T 11/00*** | (2026.01) |
| ***G06T 5/70*** | (2024.01) |
| ***G06T 5/94*** | (2024.01) |
| ***G06T 7/194*** | (2017.01) |

(52) U.S. Cl.

CPC ................ *G06T 11/00* (2013.01); *G06T 5/70* (2024.01); *G06T 5/94* (2024.01); *G06T 7/194* (2017.01); *G06T 2207/20081* (2013.01); *G06T 2207/20084* (2013.01)

(58) Field of Classification Search

None

See application file for complete search history.

(56) References Cited

U.S. PATENT DOCUMENTS

| | | | | |
|---|---|---|---|---|
| 9,430,715 | B1 * | 8/2016 | Wang | G06T 5/94 |
| 12,430,810 | B2 * | 9/2025 | Sen | G06T 5/94 |
| 2023/0325996 | A1 * | 10/2023 | Zhang | G06T 5/50 |
| 2024/0296612 | A1 * | 9/2024 | Rhodes | G06T 13/40 |
| 2024/0404138 | A1 * | 12/2024 | Zhang | G06T 7/11 |
| 2025/0182248 | A1 * | 6/2025 | Fan | G06T 3/4046 |
| 2025/0225609 | A1 * | 7/2025 | Reddy | G06V 10/56 |
| 2025/0292462 | A1 * | 9/2025 | Feng | G06T 11/60 |

(Continued)

OTHER PUBLICATIONS

Yoon JS, Shu Z, Ren M, Zhang C, Hold-Geoffroy Y, Singh KK, Zhang H. Generative portrait shadow removal. ACM Transactions on Graphics (TOG). Dec. 19, 2024;43(6):1-3. (Year: 2024).*

(Continued)

*Primary Examiner* — Michelle M Entezari Hausmann

(74) *Attorney, Agent, or Firm* — Keller Preece PLLC

(57) ABSTRACT

The present disclosure relates to systems, methods, and non-transitory computer-readable media that performs shadow removal and harmonizes lighting properties of a foreground with a background. Furthermore, the disclosed systems receive a shadow removal request for an input digital image that includes a foreground object with a shadow occluding at least part of the foreground object. Moreover, the disclosed systems generate a combined embedding from a mask of the foreground object and the input digital image. Further, the disclosed systems generate a modified digital image without the shadow occluding at least part of the foreground object and lighting properties of the foreground object harmonized with lighting properties of a background.

20 Claims, 16 Drawing Sheets

(56) References Cited

U.S. PATENT DOCUMENTS

| | | | | |
|---|---|---|---|---|
| 2025/0315922 A1* | 10/2025 | Jawade | .................. | H04N 5/272 |
| 2025/0328987 A1* | 10/2025 | Ren | ...................... | G06V 10/771 |
| 2025/0336119 A1* | 10/2025 | Wang | ...................... | G06T 11/40 |
| 2026/0065425 A1* | 3/2026 | Song | ......................... | G06T 5/50 |

OTHER PUBLICATIONS

Liu Y, Ke Z, Xu K, Liu F, Wang Z, Lau RW. Recasting regional lighting for shadow removal. InProceedings of the AAAI Conference on Artificial Intelligence Mar. 24, 2024 (vol. 38, No. 4, pp. 3810-3818). (Year: 2024).*

Liu Q, You J, Wang J, Tao X, Zhang B, Niu L. Shadow generation for composite image using diffusion model. InProceedings of the IEEE/CVF Conference on Computer Vision and Pattern Recognition 2024 (pp. 8121-8130). (Year: 2024).*

Dili G, Arun KS. Adaptive Illumination Transfer: A Cross-Attention Approach to Image Harmonization. In2026 International Conference on Innovative Trends in Information Technology (ICITIIT) Mar. 27, 2026 (pp. 1-8). IEEE. (Year: 2026).*

Abhimitra Meka, Gereon Fox, Michael Zollhöfer, Christian Richardt, and Christian Theobalt. "Live User-Guided Intrinsic Video for Static Scenes". IEEE Transactions on Visualization and Computer Graphics 23, 11, pp. 2447-2454, Nov. 2017.

Abhimitra Meka, Mohammad Shafiei, Michael Zollhöfer, Christian Richardt, and Christian Theobalt. "Real-time Global Illumination Decomposition of Videos". ACM Transactions on Graphics 40, 3, pp. 1-16. Jan. 2021.

Adrien Bousseau, Sylvain Paris, and Frédo Durand. "User-Assisted Intrinsic Images". ACM Transactions on Graphics 28, 5 (2009), 130:1-10. https://doi.org/10.1145/1618452.1618476.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. 2021. "Learning Transferable Visual Models from Natural Language Supervision". In International Conference on Machine Learning. PMLR. pp. 8748-8763. 2021.

Andres Sanin, Conrad Sanderson, and Brian C Lovell. "Shadow Detection: A Survey and Comparative Evaluation of Recent Methods". Pattern recognition 45, 4, pp. 1684-1695, 2012.

Andrew Hou, Michel Sarkis, Ning Bi, Yiying Tong, and Xiaoming Liu. "Face Relighting with Geometrically Consistent Shadows". In Proceedings of the IEEE/CVF Conference on Computer Vision and Pattern Recognition. pp. 4217-4226, 2022.

Andrew Hou, Ze Zhang, Michel Sarkis, Ning Bi, Yiying Tong, and Xiaoming Liu. "Towards High Fidelity Face Relighting with Realistic Shadows". In Proceedings of the IEEE/CVF Conference on Computer Vision and Pattern Recognition. pp. 14719-14728, 2021.

Ashish Vaswani, Noam Shazeer, Niki Parmar, Jakob Uszkoreit, Llion Jones, Aidan N Gomez, Łukasz Kaiser, and Illia Polosukhin. "Attention is All You Need". Advances in Neural Information Processing Systems (NIPS) 30, 11 pages, 2017.

Bahjat Kawar, Michael Elad, Stefano Ermon, and Jiaming Song. "Denoising Diffusion Restoration Models". Advances in Neural Information Processing Systems 35, pp. 23593-23606, 2022.

Bin Ding, Chengjiang Long, Ling Zhang, and Chunxia Xiao. "ARGAN: Attentive Recurrent Generative Adversarial Network for Shadow Detection and Removal". In Proceedings of the IEEE/CVF International Conference on Computer Vision. pp. 10213-10222, 2019.

Carl Doersch "Tutorial on Variational Autoencoders", 23 pages, arXiv preprint arXiv:1606.05908v3, Jan. 3, 2021.

Chaonan Ji, Tao Yu, Kaiwen Guo, Jingxin Liu, and Yebin Liu. "Geometry-aware Single- image Full-body Human Relighting". 24 pages, arXiv preprint arXiv:2207.04750v2, Jul. 12, 2022.

Chenglei Wu, Michael Zollhöfer, Matthias Nießner, Marc Stamminger, Shahram Izadi, and Christian Theobalt. "Real-time Shading-based Refinement for Consumer Depth Cameras". ACM Transactions on Graphics 33, 6 (2014), 200:1-10. 2014.

Christian Ledig, Lucas Theis, Ferenc Huszar, Jose Caballero, Andrew Cunningham, Alejandro Acosta, Andrew Aitken, Alykhan Tejani, Johannes Totz, Zehan Wang, et al. "Photo-Realistic Single Image Super-Resolution Using a Generative Adversarial Network". In Proceedings of the IEEE Conference on Computer Vision and Pattern Recognition. pp. 4681-4690. 2017.

Daichi Tajima, Yoshihiro Kanamori, and Yuki Endo. "Relighting Humans in the Wild: Monocular Full-Body Human Relighting with Domain Adaptation". 12 pages, arXiv preprint arXiv:2110.07272v2, Oct. 15, 2021.

David Futschik, Kelvin Ritland, James Vecore, Sean Fanello, Sergio Orts-Escolano, Brian Curless, Daniel Sýkora, and Rohit Pandey. "Controllable Light Diffusion for Portraits". In Proceedings of the IEEE/CVF Conference on Computer Vision and Pattern Recognition. pp. 8412-8421. 2023.

Elena Garces, Adolfo Muñoz, Jorge Lopez-Moreno, and Diego Gutierrez. "Intrinsic Images by Clustering". Computer Graphics Forum 31, 4, pp. 1415-1424, 2012.

Eli Arbel and Hagit Hel-Or. "Shadow Removal Using Intensity Surfaces and Texture Anchor Points". IEEE Transactions on Pattern Analysis and Machine Intelligence 33, 6, pp. 1202-1216. Jun. 2011.

Fangzhou Han, Can Wang, Hao Du, and Jing Liao. "Deep Portrait Lighting Enhancement with 3D Guidance". In Computer Graphics Forum, vol. 40. Wiley Online Library, pp. 177-188. 2021.

Guoxian Song, Tat-Jen Cham, Jianfei Cai, and Jianmin Zheng. "Half-body Portrait Relighting with Overcomplete Lighting Representation". In Computer Graphics Forum, vol. 40. Wiley Online Library, pp. 371-381, 2021.

Hao Zhou, Sunil Hadap, Kalyan Sunkavalli, and David W Jacobs. "Deep Single-Image Portrait Relighting". In Proceedings of the IEEE/CVF International Conference on Computer Vision. pp. 7194-7202, 2019.

Hao Zhou, Xiang Yu, and David W Jacobs. "GLoSH: Global-Local Spherical Harmonics for Intrinsic Image Decomposition". In IEEE/CVF International Conference on Computer Vision (ICCV). pp. 7820-7829. 2019.

Hoon Kim, Minje Jang, Wonjun Yoon, Jisoo Lee, Donghyun Na, and Sanghyun Woo. "SwitchLight: Co-design of Physics-driven Architecture and Pre-training Framework for Human Portrait Relighting". 18 pages, arXiv preprint arXiv:2402.18848, Feb. 29, 2024.

Hua-En Chang, Chia-Hsuan Hsieh, Hao-Hsiang Yang, I Chen, Yi-Chung Chen, Yuan- Chun Chiang, Zhi-Kai Huang, Wei-Ting Chen, Sy-Yen Kuo, et al. "TSRFormer: Transformer Based Two-stage Refinement for Single Image Shadow Removal". In Proceedings of the IEEE/CVF Conference on Computer Vision and Pattern Recognition. pp. 1436-1446, 2023.

Jianbing Shen, Xiaoshan Yang, Yunde Jia, and Xuelong Li. "Intrinsic Images Using Optimization". In Proceedings of IEEE Conference on Computer Vision and Pattern Recognition (CVPR). pp. 3481-3487. 2011.

Jiawei Liu, QiangWang, Huijie Fan, Jiandong Tian, and Yandong Tang. "A Shadow Imaging Bilinear Model and Three-Branch Residual Network for Shadow Removal". IEEE Transactions on Neural Networks and Learning Systems, 15 pages, 2023.

Jifeng Wang, Xiang Li, and Jian Yang. "Stacked Conditional Generative Adversarial Networks for Jointly Learning Shadow Detection and Shadow Removal". In Proceedings of the IEEE Conference on Computer Vision and Pattern Recognition. pp. 1788-1797. 2018.

Jonathan Ho, Ajay Jain, and Pieter Abbeel. "Denoising Diffusion Probabilistic Models". In the 34th Conference on Neural Information Processing Systems (NeurIPS), pp. 6840-6851, 2020.

Joshua Weir, Junhong Zhao, Andrew Chalmers, and Taehyun Rhee. "Deep Portrait Delighting". 24 pages, arXiv preprint arXiv:2203.12088v5, Jun. 21, 2022.

Joshua Weir, Junhong Zhao, Andrew Chalmers, and Taehyun Rhee. De-lighting Human Images Using Region-Specific Data Augmentation. In 38th International Conference on Image and Vision Computing New Zealand (IVCNZ). IEEE. pp. 1-6. 2023.

Jundan Luo, Nanxuan Zhao, Wenbin Li, and Christian Richardt. "CRefNet: Learning Consistent Reflectance Estimation With a

(56) References Cited

OTHER PUBLICATIONS

Decoder-Sharing Transformer". IEEE Transactions on Visualization and Computer Graphics, pp. 1-14, 2023. https://doi.org/10.1109/TVCG.2023.3337870.
Jundan Luo, Zhaoyang Huang, Yijin Li, Xiaowei Zhou, Guofeng Zhang, and Hujun Bao. "NIID-Net: Adapting Surface Normal Knowledge for Intrinsic Image Decomposition in Indoor Scenes". IEEE Transactions on Visualization and Computer Graphics 26, 12, pp. 3434-3445, 2020.
Kaiming He, Xiangyu Zhang, Shaoqing Ren, and Jian Sun. "Deep Residual Learning for Image Recognition". In Proceedings of the IEEE Conference on Computer Vision and Pattern Recognition. pp. 770-778, 2016.
Lanqing Guo, Siyu Huang, Ding Liu, Hao Cheng, and BihanWen. "ShadowFormer: Global Context Helps Shadow Removal". In Proceedings of the AAAI Conference on Artificial Intelligence, vol. 37. pp. 710-718. 2023.
Lap-Fai Yu, Sai-Kit Yeung, Yu-Wing Tai, and Stephen Lin. "Shading-based Shape Refinement of RGB-D Images". In EEE Conference on Computer Vision and Pattern Recognition (CVPR). pp. 1415-1422. 2013.
Leon A Gatys, Alexander S Ecker, and Matthias Bethge. "Image Style Transfer Using Convolutional Neural Networks". In Proceedings of the IEEE Conference on Computer Vision and Pattern Recognition (CVPR). pp. 2414-2423. 2016.
Li-Qian Ma, Jue Wang, Eli Shechtman, Kalyan Sunkavalli, and Shi-Min Hu. "Appearance Harmonization for Single Image Shadow Removal". In Computer Graphics Forum, vol. 35. Wiley Online Library, pp. 189-197, 2016.
Liangqiong Qu, Jiandong Tian, Shengfeng He, Yandong Tang, and Rynson WH Lau. "DeshadowNet: A Multi-context Embedding Deep Network for Shadow Removal". In Proceedings of the IEEE Conference on Computer Vision and Pattern Recognition (CVPR). pp. 4067-4075. 2017.
Ling Zhang, Qingan Yan, Yao Zhu, Xiaolong Zhang, and Chunxia Xiao. "Effective Shadow Removal via Multi-scale Image Decomposition". The Visual Computer 35, 12 pages, 2019. https://yanqingan.github.io/docs/cgi19_effective.pdf.
Lvmin Zhang, Anyi Rao, and Maneesh Agrawala. "IC-Light", 12 pages [online], [Retrieved Jan. 13, 2025] Retrieved from the Internet, <URL: https://github.com/Illyasviel/IC-Light>.
Maciej Gryka, Michael Terry, and Gabriel J Brostow. "Learning to Remove Soft Shadows". ACM Transactions on Graphics (TOG) 34, 5, pp. 1-15. 2015.
Manuel Lagunas, Xin Sun, Jimei Yang, Ruben Villegas, Jianming Zhang, Zhixin Shu, Belen Masia, and Diego Gutierrez. "Single-image Full-body Human Relighting". 11 pages, arXiv preprint arXiv:2107.07259, Jul. 15, 2021.
Marc-André Gardner, Kalyan Sunkavalli, Ersin Yumer, Xiaohui Shen, Emiliano Gambaretto, Christian Gagné, and Jean-François Lalonde. "Learning to Predict Indoor Illumination from a Single Image". 14 pages, arXiv preprint arXiv:1704.00090v3, Nov. 21, 2017.
Mathilde Caron, Hugo Touvron, Ishan Misra, Hervé Jégou, Julien Mairal, Piotr Bojanowski, and Armand Joulin. "Emerging Properties in Self-Supervised Vision Transformers". In Proceedings of the IEEE/CVF International Conference on Computer Vision (ICCV). pp. 9650-9660. 2021.
Maxime Oquab, Timothée Darcet, Théo Moutakanni, Huy Vo, Marc Szafraniec, VasilKhalidov, Pierre Fernandez, Daniel Haziza, Francisco Massa, Alaaeldin El-Nouby, et al. "DINOv2: Learning Robust Visual Features without Supervision". 31 pages, arXiv preprint arXiv:2304.07193, Apr. 14, 2023.
Mengwei Ren, Wei Xiong, Jae Shin Yoon, Zhixin Shu, Jianming Zhang, HyunJoon Jung, Guido Gerig, and He Zhang. "Relightful Harmonization: Lighting-aware Portrait Background Replacement". 25 pages, arXiv preprint arXiv:2312.06886, Dec. 11, 2023.
Michael McCloskey and Neal J Cohen. "Catastrophic Interference in Connectionist Networks: The Sequential Learning Problem". In Psychology of Learning and Motivation. vol. 24. Elsevier, pp. 109-165, 1989.
Michael Zollhöfer, Angela Dai, Matthias Innmann, Chenglei Wu, Marc Stamminger, Christian Theobalt, and Matthias Nießner. "Shading-based Refinement on Volumetric Signed Distance Functions". ACM Transactions on Graphics 34, 4, 96:1-14. 2015.
Mohammed Hachama, Bernard Ghanem, and Peter Wonka. "Intrinsic Scene Decomposition from RGB-D Images". In IEEE International Conference on Computer Vision (ICCV. pp. 810-818. 2015.
Nikolina Kubiak, Armin Mustafa, Graeme Phillipson, Stephen Jolly, and Simon Hadfield. "S3R-Net: A Single-Stage Approach to Self-Supervised Shadow Removal". 11 pages, arXiv preprint arXiv:2404.12103, Apr. 18, 2024.
Olaf Ronneberger, Philipp Fischer, and Thomas Brox. "U-Net: Convolutional Networks for Biomedical Image Segmentation". In Medical Image Computing and Computer-Assisted Intervention—MICCAI 2015: 18th International Conference, Munich, Germany, Oct. 5-9, 2015, proceedings, part III 18. Springer. pp. 234-241. 2015.
Paul Debevec, Tim Hawkins, Chris Tchou, Haarm-Pieter Duiker, Westley Sarokin, and Mark Sagar. "Acquiring the Reflectance Field of a Human Face". In Proceedings of the 27th annual Conference on Computer Graphics and Interactive Techniques. pp. 145-156, 2000.
Phillip Isola, Jun-Yan Zhu, Tinghui Zhou, and Alexei A Efros. "Image-to-Image Translation with Conditional Adversarial Networks". In Proceedings of the IEEE Conference on Computer Vision and Pattern Recognition (CVPR). pp. 1125-1134. 2017.
Poly Haven "The Public 3D Asset Library". (2024), 4 pages [online], [Retrieved on Jan. 13, 2025] Retrieved from the Internet, <URL: https://polyhaven.com/>.
Puntawat Ponglertnapakorn, Nontawat Tritrong, and Supasorn Suwajanakorn. "DiFaReli: Diffusion Face Relighting". In Proceedings of the IEEE/CVF International Conference on Computer Vision (ICCV). pp. 22646-22657. 2023.
Qi Zhao, Ping Tan, Qiang Dai, Li Shen, EnhuaWu, and Stephen Lin. "A Closed-Form Solution to Retinex with Nonlocal Texture Constraints". IEEE Transactions on Pattern Analysis and Machine Intelligence 34, 7, pp. 1437-1444. Jul. 2012.
Qifeng Chen and Vladlen Koltun. "A Simple Model for Intrinsic Image Decomposition with Depth Cues". In Proceedings of the IEEE International Conference on Computer Vision (ICCV). pp. 241-248. 2013.
Qingnan Fan, Jiaolong Yang, Gang Hua, Baoquan Chen, and David Wipf. 2018. Revisiting deep intrinsic image decompositions. In IEEE/CVF Conference on Computer Vision and Pattern Recognition (CVPR). pp. 8944-8952, 2018.
René Ranftl, Katrin Lasinger, David Hafner, Konrad Schindler, and Vladlen Koltun. "Towards Robust Monocular Depth Estimation: Mixing Datasets for Zero-shot Cross-dataset Transfer". IEEE Transactions on Pattern Analysis and Machine Intelligence 44, 3, pp. 1623-1637. Mar. 2020.
Richard Zhang, Phillip Isola, Alexei A Efros, Eli Shechtman, and Oliver Wang. "The Unreasonable Effectiveness of Deep Features as a Perceptual Metric". In IEEE/CVF Conference on Compute (CVPR). pp. 586-595, 2018.
Robin Rombach, Andreas Blattmann, Dominik Lorenz, Patrick Esser, and Björn Ommer. "High-Resolution Image Synthesis with Latent Diffusion Models". In Proceedings of the IEEE/CVF Conference on Computer Vision and Pattern Recognition (CVPR). pp. 10684-10695, 2022.
Roger Grosse, Micah K Johnson, Edward H Adelson, and William T Freeman. "Ground Truth Dataset and Baseline Evaluations for Intrinsic Image Algorithms". In IEEE 12th International Conference on Computer Vision (ICCV). pp. 2335-2342. 2009.
Rohit Pandey, Sergio Orts-Escolano, Chloe Legendre, Christian Haene, Sofien Bouaziz, Christoph Rhemann, Paul E Debevec, and Sean Ryan Fanello. "Total Relighting: Learning to Relight Portraits for Background Replacement". ACM Transactions on Graphics (TOG). 40, 4, pp. 1-21. 2021.

(56) References Cited

OTHER PUBLICATIONS

Sai Bi, Xiaoguang Han, and Yizhou Yu. "An L1 Image Transform for Edge-Preserving Smoothing and Scene-Level Intrinsic Decomposition". ACM Transactions on Graphics 34, 4, 78:1-12. 2015.
Salman H Khan, Mohammed Bennamoun, Ferdous Sohel, and Roberto Togneri. "Automatic Shadow Detection and Removal from a Single Image". IEEE Transactions on Pattern Analysis and Machine Intelligence 38, 3, pp. 431-446. 2015.
Sean Bell, Kavita Bala, and Noah Snavely. "Intrinsic Images in the Wild". ACM Transactions on Graphics 33, 4 (2014), 159:1-12. 2014.
Seungryong Kim, Kihong Park, Kwanghoon Sohn, and Stephen Lin. "Unified Depth Prediction and Intrinsic Image Decomposition from a Single Image via Joint Convolutional Neural Fields". In ECCV. Part VIII, LNCS 9912, Springer. pp. 143-159.
Shangchen Zhou, Kelvin Chan, Chongyi Li, and Chen Change Loy. "Towards Robust Blind Face Restoration with Codebook Lookup Transformer". Advances in Neural Information Processing Systems 35, pp. 30599-30611. 2022.
Tao Wang, Kaihao Zhang, Xuanxi Chen, Wenhan Luo, Jiankang Deng, Tong Lu, Xiaochun Cao, Wei Liu, Hongdong Li, and Stefanos Zafeiriou. "A Survey of Deep Face Restoration: Denoise, Super-Resolution, Deblur, Artifact Removal". 21 pages, arXiv preprint arXiv:2211.02831 Nov. 5, 2022.
Thomas Nestmeyer, Jean-François Lalonde, lain Matthews, and Andreas Lehrmann. "Learning Physics-guided Face Relighting under Directional Light". In Proceedings of the IEEE/CVF Conference on Computer Vision and Pattern Recognition (CVPR). pp. 5124-5133, 2020.
Tiancheng Sun, Jonathan T Barron, Yun-Ta Tsai, Zexiang Xu, Xueming Yu, Graham Fyffe, Christoph Rhemann, Jay Busch, Paul Debevec, and Ravi Ramamoorthi. "Single Image Portrait Relighting". ACM Transactions on Graphics (TOG) 38, 4, pp. 1-12, 2019.
Tim Brooks, Aleksander Holynski, and Alexei A Efros. "InstructPix2Pix: Learning to Follow Image Editing Instructions". In Proceedings of the IEEE/CVF Conference on Computer Vision and Pattern Recognition (CVPR), pp. 18392-18402. 2023.
Tim Brooks, Bill Peebles, Connor Holmes, Will DePue, Yufei Guo, Li Jing, David Schnurr, Joe Taylor, Troy Luhman, Eric Luhman, Clarence Ng, Ricky Wang, and Aditya Ramesh. "Video Generation Models as World Simulators". 10 pages, Feb. 15, 2024. https://openai.com/research/video-generation-models-as-world-simulators.
Weicai Ye, Shuo Chen, Chong Bao, Hujun Bao, Marc Pollefeys, Zhaopeng Cui, and Guofeng Zhang. IntrinsicneRF: Learning Intrinsic Neural Radiance Fields for Editable Novel View Synthesis. In Proceedings of the IEEE/CVF International Conference on Computer Vision (ICCV), pp. 339-351. 2023.
Xiangyu Chen, Xintao Wang, Jiantao Zhou, Yu Qiao, and Chao Dong. "Activating More Pixels in Image Super-Resolution Transformer". In Proceedings of the IEEE/CVF Conference on Computer Vision and Pattern Recognition (CVPR), pp. 22367-22377, 2023.
Xiaowei Hu, Chi-Wing Fu, Lei Zhu, Jing Qin, and Pheng-Ann Heng. "Direction-aware Spatial Context Features for Shadow Detection and Removal". IEEE Transactions on Pattern Analysis and Machine Intelligence 42, 11, pp. 2795-2808, Nov. 2020.
Xuaner Zhang, Jonathan T Barron, Yun-Ta Tsai, Rohit Pandey, Xiuming Zhang, Ren Ng, and David E Jacobs. "Portrait Shadow Manipulation". ACM Transactions on Graphics (TOG) 39, 4, pp. 78-1. Jul. 2020.
Yannick Hold-Geoffroy, Akshaya Athawale, and Jean-François Lalonde. "Deep Sky Modeling for Single Image Outdoor Lighting Estimation". In Proceedings of the IEEE/CVF Conference on Computer Vision and Pattern Recognition (CVPR), pp. 6927-6935, 2019.
Yaojie Liu, Andrew Z Hou, Xinyu Huang, Liu Ren, and Xiaoming Liu. "Blind Removal of Facial Foreign Shadows". In BMVC. 88. 2022.
Yeying Jin, Ruoteng Li, Wenhan Yang, and Robby T Tan. "Estimating Reflectance Layer from A Single Image: Integrating Reflectance Guidance and Shadow/Specular Aware Learning". In The Thirty-Seventh AAAI Conference Artificial Intelligence. pp. 1069-1077, 2023.
Yifan Wang, Aleksander Holynski, Xiuming Zhang, and Xuaner Zhang. "Sunstage: Portrait Reconstruction and Relighting using the Sun as a Light Stage". In Proceedings of the IEEE/CVF Conference on Computer Vision and Pattern Recognition (CVPR). pp. 20792-20802, 2023.
Yiqun Mei, He Zhang, Xuaner Zhang, Jianming Zhang, Zhixin Shu, Yilin Wang, Zijun Wei, Shi Yan, HyunJoon Jung, and Vishal M Patel. "LightPainter: Interactive Portrait Relighting with Freehand Scribble". In Proceedings of the IEEE/CVF Conference on Computer Vision and Pattern Recognition (CVPR). pp. 195-205, 2023.
Yiqun Mei, Yu Zeng, He Zhang, Zhixin Shu, Xuaner Zhang, Sai Bi, Jianming Zhang, HyunJoon Jung, and Vishal M Patel. "Holo-Relighting: Controllable Volumetric Portrait Relighting from a Single Image". 11 pages, arXiv preprint arXiv:2403.09632, Mar. 14, 2024.
Yu-Ying Yeh, Koki Nagano, Sameh Khamis, Jan Kautz, Ming-Yu Liu, and Ting-Chun Wang. "Learning to Relight Portrait Images via a Virtual Light Stage and Syntheticto-Real Adaptation". ACM Transactions on Graphics (TOG) 41, 6, pp. 1-21, Dec. 2022.
Yunfei Liu, Yu Li, Shaodi You, and Feng Lu. "Unsupervised Learning for Intrinsic Image Decomposition from a Single Image". In IEEE/CVF Conference on Computer Vision and Pattern Recognition (CVPR). pp. 3248-3257, 2020.
Zhengqi Li and Noah Snavely. "CGIntrinsics: Better Intrinsic Image Decomposition Through Physically-Based Rendering". In Proceedings of the European Conference on Computer Vision (ECCV). pp. 371-387, 2018.
Zhou Wang, Alan C Bovik, Hamid R Sheikh, and Eero P Simoncelli. "Image Quality Assessment: From Error Visibility to Structural Similarity". IEEE Transactions on Image Processing 13, 4, pp. 600-612. 2004.
Zipei Chen, Chengjiang Long, Ling Zhang, and Chunxia Xiao. "Canet: A Context-Aware Network for Shadow Removal". In Proceedings of the IEEE/CVF International Conference on Computer Vision (ICCV). pp. 4743-4752, 2021.

* cited by examiner

GENERATIVE PORTRAIT SHADOW REMOVAL

BACKGROUND

Recent years have seen significant advancement in hardware and software platforms for performing shadow removal tasks. Indeed, conventional systems provide a variety of ways to remove a shadow from a digital image. Some conventional systems also use generative models to generate a portion of an image to replace the removed shadow. For instance, conventional systems predict a residual appearance that diffuses the neighboring pixels and gives the appearance of a removed shadow. Despite the advances in shadow-oriented tasks in digital image editing, systems suffer from a number of deficiencies with regards to accuracy, efficiency, and operational flexibility.

SUMMARY

One or more embodiments described herein provide benefits and/or solve one or more problems in the art with systems, methods, and non-transitory computer-readable media that implement a trained shadow removal denoising model to perform shadow removal in a manner that enhances the digital image by predicting its appearance under disturbing shadows and highlights. To illustrate, in one or more embodiments, disclosed systems address shadow removal as a generative task for shadow-free portrait images by using a generative diffusion model to learn to reconstruct an image from scratch. Specifically, the disclosed systems receive a shadow removal request for a digital image that includes a foreground object with a shadow occluding at least part of the foreground object. For example, given the digital image, the disclosed systems generate a combined embedding from a mask of the foreground object and the digital image. Moreover, the disclosed systems further generate a modified digital image with the shadow occluding at least part of the foreground object and lighting properties of the foreground object harmonized with lighting properties of a background of the digital image by conditioning layers of the trained shadow removal denoising model with a version of the input digital image (e.g., a low-resolution version).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
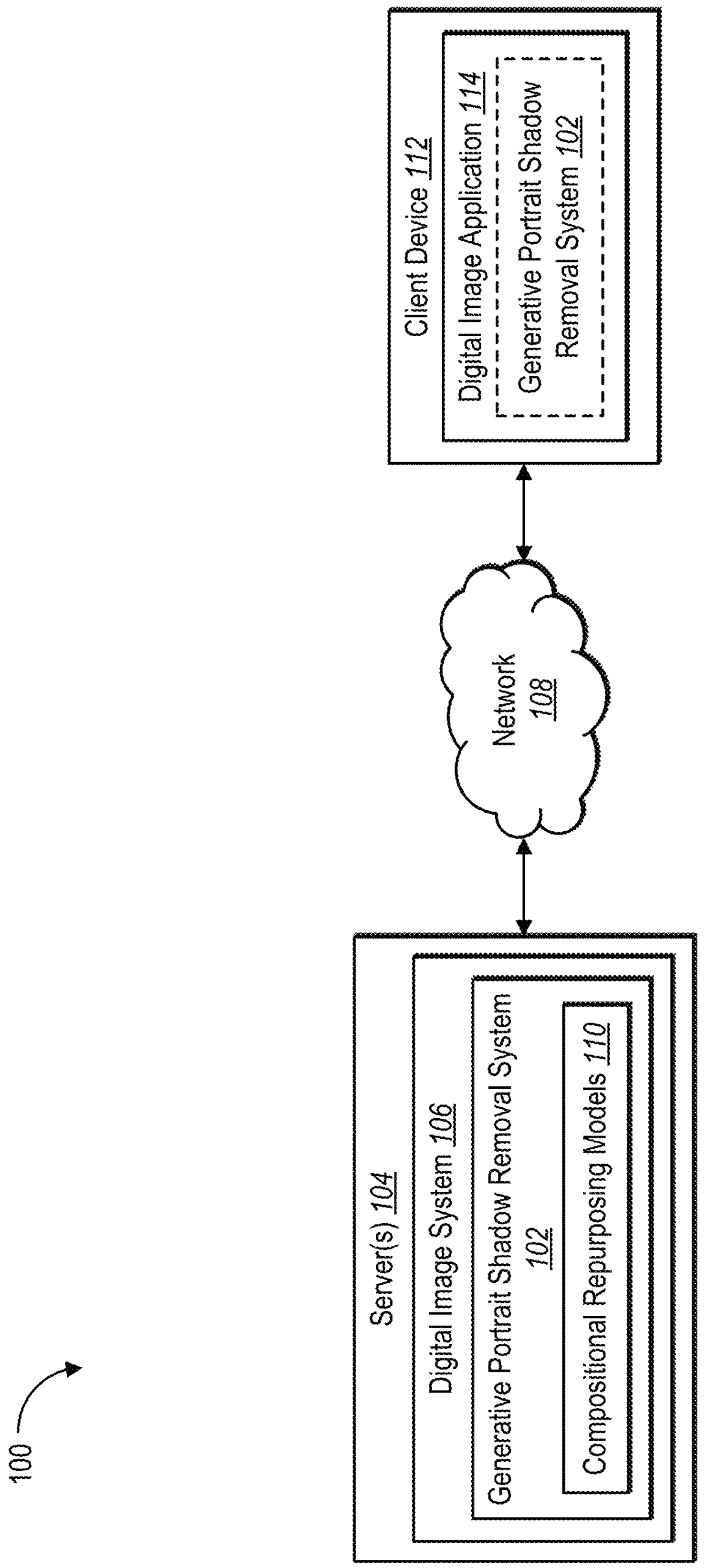
FIG. 1 illustrates an example environment in which a generative portrait shadow removal system operates in accordance with one or more implementations.

One or more embodiments described herein includes a high-fidelity portrait shadow removal framework that effectively enhances the image of a portrait by predicting its appearance under disturbing shadows and highlights. For example, disentangling complex environmental lighting from original skin color is a non-trivial problem and a generative portrait shadow removal system addresses this by formulating the problem as a generation task where a diffusion model learns to globally rebuild the human appearance from scratch as a condition of an input portrait image. For example, the generative portrait shadow removal system repurposes a pretrained text-to-image diffusion model via multiple fine-tuning steps. Specifically, the generative portrait shadow removal system optimizes parameters of a denoising model by first fine-tuning a denoising model to harmonize the lighting and color of the foreground with a background scene. Further, the generative portrait shadow removal system performs a second fine-tuning step to optimize parameters of the denoising model to generate a shadow-free portrait image.

At implementation time, the generative portrait shadow removal system receives a shadow removal request to remove a shadow occluding at least part of a foreground object and uses the trained shadow removal denoising model to generate a modified digital image. Specifically, the modified digital image depicts the foreground object without the shadow and lighting properties of the foreground object harmonized with lighting properties of a background scene. Additionally, in some embodiments, the generative portrait shadow removal system implements an upsampling network to restore original high-frequency details from the input digital image.

As mentioned above, the generative portrait shadow removal system performs a first fine-tuning step to optimize parameters of light harmonization between the foreground and background. Specifically, the generative portrait shadow removal system maintains an original lighting distribution by using a curated image dataset that contains images specifically tailored for background lighting harmonization. For instance, the generative portrait shadow removal system constructs a high-quality shadow removal dataset using data captured and rendered by a lightstage (e.g., portrait images under diverse lighting and background scenes), synthetically rendered humans, and augmented real-world portraits (e.g., leveraging three-dimensional geometry such as depth and normal). For example, by using the curate image dataset, the generative portrait shadow removal system optimizes a denoising model to effectively harmonize background lighting with foreground lighting in a natural and high-quality manner.

Moreover, as mentioned, the generative portrait shadow removal system performs a second fine-tuning step to optimize parameters of shadow removal. Specifically, the generative portrait shadow removal system uses the high-quality shadow removal dataset to learn parameters for removing a shadow from a portrait digital image. Additionally, the generative portrait shadow removal system optimizes parameters of an upsampling network to preserve the portrait identity with minimum loss of high-frequency details (e.g., wrinkles, freckles, etc. that were originally present in the portrait image) using the high-quality shadow removal dataset.

As mentioned, at implementation time, the generative portrait shadow removal system receives a shadow removal request. Moreover, the generative portrait shadow removal system generates a combined embedding from a mask of a foreground object (e.g., the foreground object is at least partially occluded by a shadow), the input digital image, and a latent noise representation. Furthermore, the generative portrait shadow removal system generates a modified digital image from the combined embedding and by conditioning layers of a trained shadow removal denoising model (e.g., a model that has undergone the fine-tuning steps discussed above) with a version of the input digital image. For instance, the generative portrait shadow removal system conditions layers of the trained shadow removal denoising model with a downsampled or low-resolution version of the input digital image to capture the background lighting distribution. Thus, at implementation time, the generative portrait shadow removal system generates a modified digital image without the shadow and with harmonized lighting between the foreground and the background.

As mentioned above, conventional systems suffer from a variety of issues related to accuracy, efficiency, and operational flexibility. Specifically, conventional systems suffer from computational inaccuracies. For example, for shadow-related tasks, conventional systems focus on predicting the appearance residuals that propagate local shadow distribution. In predicting the appearance residuals, conventional systems often generate images with unnatural predictions, especially in instances of removing hard shadows from portrait images. Moreover, some conventional systems struggle with removing the texture beneath the shadow when removing shadows from a digital image. As a result, conventional systems often generate portrait images with removed shadows that are incomplete and yield artifacts (e.g., such as blurs).

In addition, conventional systems attempt to employ a variety of methods to effectively suppress disturbing shadows in portrait images by using more advanced neural networks. However, these methods ultimately generate sub-par results due to the residual predictions being too flat and their lighting distribution largely fluctuating relative to the original image. Furthermore, conventional systems especially struggle with shadow removal from portrait images because the vast majority of training datasets are for removal of shadows from general scenes. Thus, conventional systems often generate low-quality and unnatural images with removed shadows.

Moreover, in some embodiments, conventional systems often suffer from inefficiencies for removing a shadow from a portrait image. Specifically, conventional systems typically require additional inputs, processing, and feedback at implementation time. For example, conventional systems typically generate a sub-par result. Moreover, because conventional systems typically generate a sub-par result for a portrait digital image, conventional systems also require additional inputs to further edit and revise such sub-par results. Thus, conventional systems at implementation time consume additional time and computational resources to attempt to generate a shadow-free portrait image.

Relatedly, conventional systems also suffer from operational inflexibilities. Specifically, conventional systems fail to accurately and efficiently adjust to portrait digital images with shadows. For instance, because conventional systems employ a variety of models trained on sub-optimal datasets, conventional systems thus fail to accurately and effectively remove shadows from a portrait digital image while preserving a natural and high-quality appearance.

In one or more embodiments, the generative portrait shadow removal system provides several improvements over conventional systems in relation to accuracy, efficiency, and operational flexibility. In contrast to conventional systems which predict the appearance residual and generate unnatural images, the generative portrait shadow removal system globally rebuilds an image from scratch to harmonize lighting properties of the foreground with lighting properties of a background and effectively removes the shadow from the foreground object (e.g., a portrait subject).

Specifically, the generative portrait shadow removal system generates a combined embedding of a mask of the foreground object and the input digital image and conditions layers of a trained shadow removal denoising model with a version of the input digital image. For instance, the generative portrait shadow removal system uses down-sampled (e.g., lower-resolution) versions of an input digital image to capture the background lighting distribution to condition layers of the trained shadow removal denoising model. Thus, the generative portrait shadow removal system accurately generates a modified digital image without the shadow occluding at least part of the foreground object and harmonized lighting properties with a natural and high-quality appearance.

In one or more embodiments, the generative portrait shadow removal system uses a specially curated image dataset (e.g., curated for portrait shadow removal) to fine-tune a denoising model and generate high-quality portrait images with shadows removed. For instance, rather than flat, and unnatural lighting distributions, the generative portrait shadow removal system generates parameters for a trained shadow removal denoising model that both removes shadows in an accurate manner and preserves an original lighting distribution.

Additionally, the generative portrait shadow removal system further improves upon accuracy by leveraging an upsampling network. For instance, a portrait image prior to shadow removal often contains a lot of high-frequency details such as wrinkles, freckles, dots, etc. Conventional systems typically inadvertently remove these details when removing shadows. In contrast, the generative portrait shadow removal system restores these high-frequency details after shadow removal and lighting harmonization by utilizing an up-sampling network. Thus, the generative portrait shadow removal system has higher quality (e.g., more accurate) results than conventional systems.

Moreover, in one or more embodiments, the generative portrait shadow removal system improves upon computational efficiency of conventional systems. In contrast to conventional systems which typically require additional inputs after removing a shadow, at implementation time, the generative portrait shadow removal system generates a satisfactory portrait image with a shadow removed. Specifically, as mentioned above, the generative portrait shadow removal system fine-tunes a denoising network for both lighting harmonization (e.g., to maintain a natural lighting distribution) and shadow removal. Moreover, the generative portrait shadow removal system uses the upsampling network to restore any lost high-frequency details. In doing so, the generative portrait shadow removal system does not require additional inputs from a client device to refine a digital image. Thus, at implementation time, the generative portrait shadow removal system preserves computational resources and time.

Relatedly, the generative portrait shadow removal system also improves upon operational flexibility of conventional systems. Specifically, the generative portrait shadow removal system accurately and effectively adjusts to the portrait digital image domain. For instance, the generative portrait shadow removal system trains a denoising model on a specially curated image dataset to accurately and effectively harmonize lighting properties and remove shadows while preserving a natural and high-quality appearance.

Additional details regarding the referring expression segmentation system will now be provided with reference to the figures. For example, FIG. 1 illustrates a schematic diagram of an exemplary system environment 100 in which a generative portrait shadow removal system 102 operates. As illustrated in FIG. 1, the system environment 100 includes server(s) 104, a digital image system 106, a network 108, and a client device 112. Additionally, FIG. 1 illustrates that the digital image system 106 includes the generative portrait shadow removal system 102, which includes compositional repurposing models 110. Moreover, the client device 112 includes a digital image application 114.

The compositional repurposing models 110 repurposes a pretrained text-to-image diffusion model via multiple fine-tuning steps. Specifically, the generative portrait shadow removal system 102 utilizes the compositional repurposing models 110 to optimize parameters of a pretrained text-to-image diffusion model by first fine-tuning the pretrained text-to-image diffusion model to harmonize the lighting and color of the foreground with a background scene, as described in greater detail in relation to FIG. 6A. Additionally, the compositional repurposing models 110 perform a second fine-tuning step to optimize parameters of the pre-trained text-to-image diffusion model to generate a shadow-free portrait image, as described in greater detail in relation to FIG. 6B.

Although the system environment 100 of FIG. 1 is depicted as having a particular number of components, the system environment 100 is capable of having a different number of additional or alternative components (e.g., a different number of servers, client devices, or other components in communication with the generative portrait shadow removal system 102 via the network 108). Similarly, although FIG. 1 illustrates a particular arrangement of the server(s) 104, the network 108, and the client device 112, various additional arrangements are possible.

The server(s) 104, the network 108, and the client device 112 are communicatively coupled with each other either directly or indirectly (e.g., through the network 108 discussed in greater detail below in relation to FIG. 12). Moreover, the server(s) 104 and the client device 112 include one or more of a variety of computing devices (including one or more computing devices as discussed in greater detail in relation to FIG. 12).

As mentioned above, the system environment 100 includes the server(s) 104. In one or more embodiments, the server(s) 104 process input for a shadow removal request for a digital image (e.g., a portrait digital image). In one or more embodiments, the server(s) 104 comprise a data server. In some implementations, the server(s) 104 comprise a communication server or a web-hosting server.

In some embodiments, the client device 112 includes computing devices associated with the one or more user accounts that submit shadow removal requests for the generative portrait shadow removal system 102 to generate a modified digital image with the shadow removed and lighting harmonized. For instance, the generative portrait shadow removal system 102 trains one or more models (e.g., the pre-trained diffusion model) from training datasets curated by the generative portrait shadow removal system 102 that includes various augmentations, perturbations, and lighting sources.

In one or more embodiments, the client device 112 includes smartphones, tablets, desktop computers, laptop computers, head-mounted-display devices, or other electronic devices. The client device 112 includes one or more software applications (e.g., the digital image application 114 includes a digital image editing application) for generating a modified digital image in accordance with the digital image system 106. In one or more embodiments, the digital image application 114 includes a software application hosted on the server(s) 104 accessible by the client device 112 through another application, such as a web browser.

To provide an example implementation, in some embodiments, generative portrait shadow removal system 102 on the server(s) 104 supports the generative portrait shadow removal system 102 on the client device 112. For instance, in some cases, the digital image system 106 on the server(s) 104 trains the generative portrait shadow removal system 102. In response, the generative portrait shadow removal system 102, via the server(s) 104, provides the information to the client device 112. In other words, the client device 112 obtains (e.g., downloads) the generative portrait shadow removal system 102 from the server(s) 104. Once downloaded, the generative portrait shadow removal system 102 on the client device 112 provides tools for indicating a digital image to remove a shadow or a specific shadow to remove within a digital image.

In alternative implementations, the generative portrait shadow removal system 102 includes a web hosting application that allows the client device 112 to interact with content and services hosted on the server(s) 104. To illustrate, in one or more implementations, the client device 112 access a software application supported by the server(s) 104. In response, the generative portrait shadow removal system 102 on the server(s) 104 provides tools for selecting a digital image or a specific shadow within a digital image to remove and for the generative portrait shadow removal system 102 to harmonize the lighting.

Indeed, in some embodiments, the generative portrait shadow removal system 102 is implemented in whole, or in part, by the individual elements of the system environment 100. For instance, although FIG. 1 illustrates the generative portrait shadow removal system 102 implemented or hosted on the server(s) 104, different components of the generative portrait shadow removal system 102 are able to be implemented by a variety of devices within the system environment 100. For example, one or more (or all) components of the generative portrait shadow removal system 102 are implemented by a different computing device or a separate server from the server(s) 104. Indeed, as shown in FIG. 1, the client device 112 includes the generative portrait shadow removal system 102. Example components of the generative portrait shadow removal system 102 will be described below with regard to FIG. 10.

As mentioned above, FIG. 2 illustrates an overview of the generative portrait shadow removal system 102 at implementation time generating a modified digital image in accordance with one or more embodiments. In some embodiments, the generative portrait shadow removal system 102 performs the act of generating a modified digital image with a shadow removed and harmonized lighting in response to receiving a shadow removal request.

In some embodiments, a shadow removal request includes a request sent from a client device to remove a shadow from a digital image. Specifically, the shadow removal request includes an input digital image 206 with a shadow. In some embodiments, the shadow removal request includes the generative portrait shadow removal system 102 receiving a selection of the shadow in the input digital image 206 from a client device. For instance, the generative portrait shadow removal system 102 receives the input digital image 206 that includes a foreground object with a shadow occluding at least part of the foreground object and further receives the shadow removal request to remove the shadow occluding at least part of the foreground object.

As mentioned, the shadow removal request includes a request to remove a shadow from the input digital image 206. In some embodiments, the input digital image 206 portrays a static, two-dimensional image. In particular, the input digital image 206 portrays a two-dimensional projection of a scene that was captured from the perspective of a camera. Accordingly, the input digital image 206 reflects the conditions (e.g., the lighting, the surrounding environment, or the physics to which the portrayed objects are subject) under which the image was captured (e.g., statically). In some embodiments, the input digital image 206 includes a digital frame composed of various pictorial elements. In particular, the pictorial elements include pixel values that define the spatial and visual aspects of the input digital image 206. For example, the input digital image 206 contains a digital frame where objects within the frame are visible while objects outside of the frame are not visible. For instance, the input digital image 206 includes a plurality of individual pixels that depict one or more object(s).

Moreover, in some embodiments, the input digital image 206 contains a scene. For example, a scene includes visual elements within the input digital image 206 that depict a specific environment or scenario. In particular, the scene includes objects, background elements, foreground elements, background lighting, foreground lighting, colors and other visual elements that convey a specific narrative. For instance, the scene includes a subject or theme such as a portrait of a subject, a nature landscape, a busy city street, a home, or a sporting event.

Figure 2:
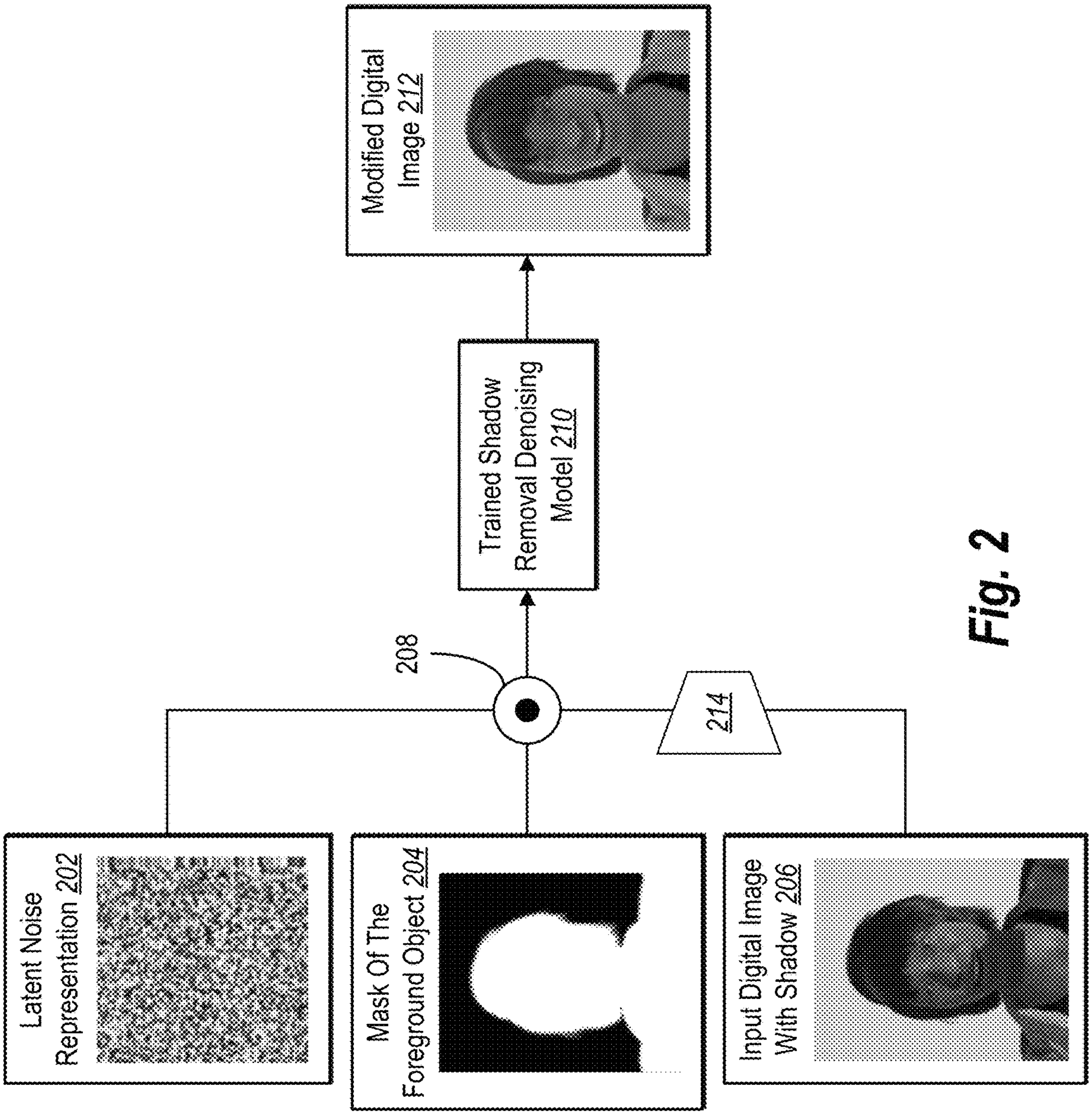
FIG. 2 illustrates an overview diagram of the generative portrait shadow removal system at implementation time, generating a modified digital image without a shadow occlusion and foreground lighting harmonized with background lighting in accordance with one or more implementations.

FIG. 2 shows the input digital image 206 depicting a subject (e.g., a portrait image) as a foreground object. In some embodiments, a portrait of a subject includes a visual representation of a person or a group of people. Specifically, the portrait of a subject includes facial features, expressions and personality of the subject(s). For instance, the portrait of the subject includes a subject's face, highlights facial features of the subject, the expression of the subject, and sometimes the upper body of the subject. Thus, in FIG. 2 the input digital image 206 with the shadow is a portrait digital image.

In some embodiments, a foreground object includes a collection of pixels in a digital image that depicts a person, place, or thing in a front or foreground portion of the input digital image 206. To illustrate, in some embodiments, the foreground object includes a person, an item, a natural object (e.g., a tree or rock formation) or a structure depicted in the forefront (e.g., as opposed to the background) of the input digital image 206. In some instances, the foreground object refers to a plurality of elements that, collectively, are distinguishable from other elements depicted in a digital image. For example, in some instances, the foreground object includes a portrait of a human subject's face.

Moreover, the input digital image 206 shows a shadow occluding at least part of the subject's face (e.g., the foreground object). For example, a shadow includes a dark area or shape cast onto a surface from an object when the object blocks a source of light. Furthermore, a shadow varies in size, shape and intensity depending on an angle of the object positioned in front of a light source. For instance, a shadow from an object within a digital image includes a two-dimensional representation. Moreover, the shadow from the object is typically cast onto a surface and various properties of the surface is still visible due to the shadow's translucent nature.

As shown in FIG. 2, the generative portrait shadow removal system 102 further obtains a mask of the foreground object 204 of the input digital image 206. In one or more embodiments, a mask of the foreground object includes a map of a digital image that has an indication for each pixel of whether the pixel corresponds to part of the foreground object (or other semantic area) or not. In some implementations, the indication includes a binary indication (e.g., a "1" for pixels belonging to the foreground object and a "0" for pixels not belonging to the foreground object). In alternative implementations, the indication includes a probability (e.g., a number between 1 and 0) that indicates the likelihood that a pixel belongs to an object. In such implementations, the closer the value is to 1, the more likely the pixel belongs to the foreground object and vice versa.

Furthermore, FIG. 2 shows the generative portrait shadow removal system 102 receiving a latent noise representation 202. In one or more embodiments, the latent noise representation 202 includes the addition of random noise as input data. For instance, the latent noise representation 202 includes Gaussian noise sampled from a normal distribution with a mean of zero and a specified standard deviation.

FIG. 2 further shows the generative portrait shadow removal system 102 combining the latent noise representation 202, the mask of the foreground object 204, and the input digital image 206 with shadow. Specifically, the generative portrait shadow removal system 102 performs an act 208 of combining the latent noise representation 202, the mask of the foreground object 204, and the input digital image 206 to generate a combined embedding. Specifically, the generative portrait shadow removal system 102 extracts latent features from the input digital image 206 utilizing an encoder 214 as described in greater detail below. For instance, the generative portrait shadow removal system 102 combines the latent noise representation 202, the mask of the foreground object 204 and the latent features from the input digital image 206 by performing a summation operation. In particular, the summation operation adds together each of the latent noise representation, the mask of the foreground object, and the latent features of the input digital image. For instance, the summation operation includes concatenating the latent noise representation 202, the mask of the foreground object 204, and the latent features of the input digital image 206.

As shown, the generative portrait shadow removal system 102 utilizes a trained shadow removal denoising model 210 to generate a modified digital image 212. In some embodiments, the modified digital image 212 includes the input digital image 206 without the shadow occluding at least part of the foreground object shown in the input digital image 206. Specifically, the modified digital image 212 further includes lighting properties of the foreground object harmonized with lighting properties of a background of the input digital image 206. For instance, the generative portrait shadow removal system 102 receives the shadow removal request and removes the shadow while also harmonizing the lighting between the foreground lighting and the background lighting in response to the shadow removal request.

Figure 3:
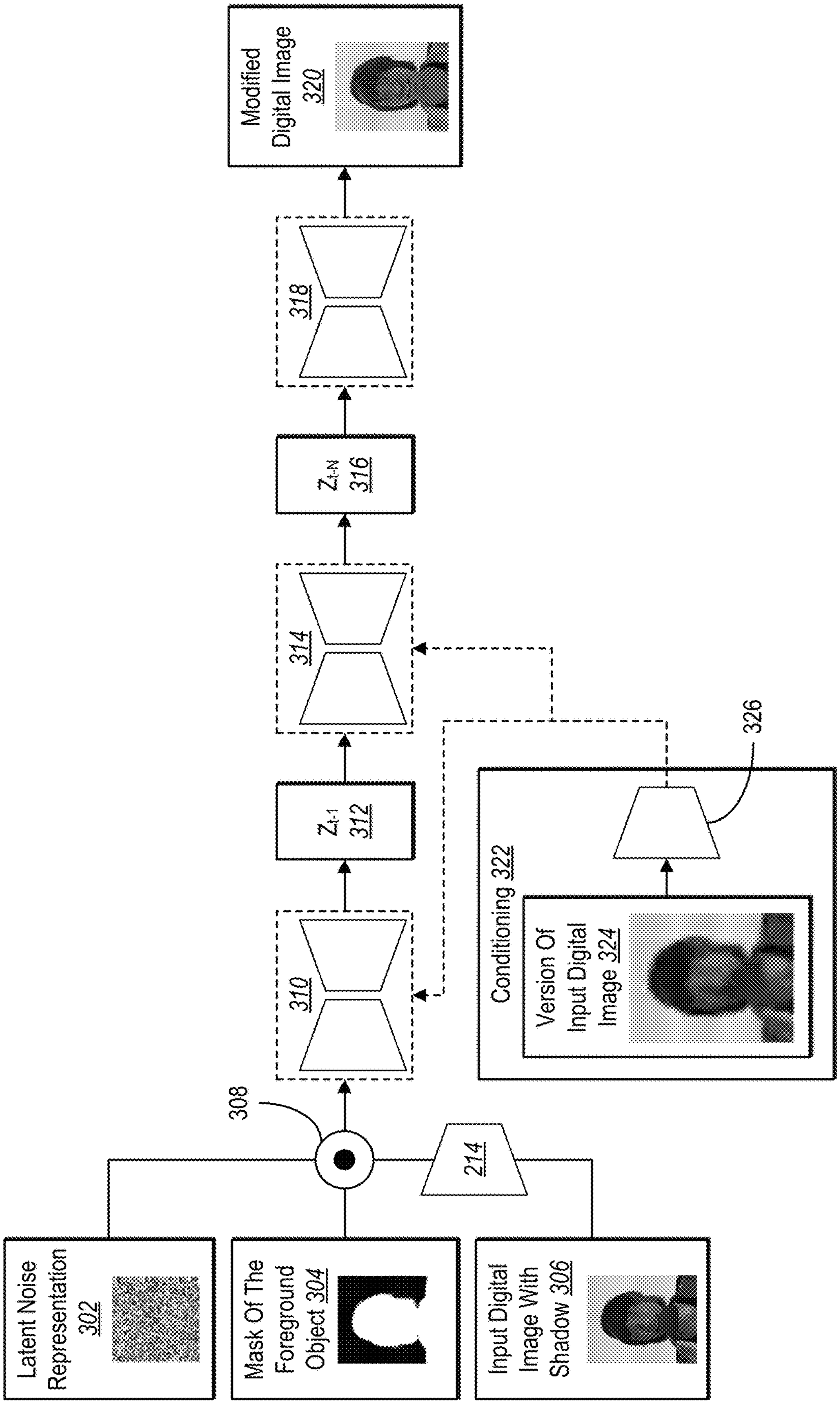
FIG. 3 illustrates a diagram of the generative portrait shadow removal system using a trained shadow removal denoising model to generate a modified digital image with a removed shadow in accordance with one or more implementations.

As mentioned above, the generative portrait shadow removal system 102 utilizes a trained shadow removal denoising model to generate a combined embedding and further generate a modified digital image. FIG. 3 shows the generative portrait shadow removal system 102 utilizing the architecture of a denoising model in accordance with one or more embodiments.

In one or more embodiments a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

As shown, the generative portrait shadow removal system 102 receives a latent noise representation 302, a mask 304 of the foreground object, and an input digital image 306 with shadow. In one or more embodiments, during training of a diffusion neural network, a diffusion neural network receives as input a digital image and adds noise to the digital image through a series of steps. For instance, the generative portrait shadow removal system 102 via the encoder 214 maps a digital image to a latent space. The generative portrait shadow removal system 102 utilizes a fixed Markov chain that adds noise to the data of the digital image until the diffusion representation is diffused, destroyed, or replaced.

Furthermore, each step of the fixed Markov chain relies upon the previous step. Specifically, at each step, the fixed Markov chain adds Gaussian noise with variance which produces a diffusion representation (e.g., diffusion latent vector, a diffusion noise map, or a diffusion inversion). In some embodiments, the generative portrait shadow removal system 102 adjusts the number of diffusion layers in the diffusion process (and the number of corresponding denoising layers in the denoising process).

As part of the diffusion neural network, the generative portrait shadow removal system 102 also utilizes a denoising neural network. Subsequent to adding noise to the digital image at various steps of the diffusion neural network, the generative portrait shadow removal system 102 utilizes a denoising neural network to recover the original data from the digital image. Specifically, the generative portrait shadow removal system 102 utilizes a denoising neural network with a length T equal to the length of the fixed Markov chain to reverse the process of the fixed Markov chain.

FIG. 3 shows a first denoising layer 310, a second denoising layer 314 and an Nth denoising layer 318 (e.g., denoising steps). In one or more embodiments, a denoising layer includes convolutional layers (e.g., to capture spatial information and patterns within a latent noise representation), normalization layers (e.g., to normalize inputs to each layers), activation functions, and attention mechanisms (e.g., to focus on important features in the data).

Specifically, FIG. 3 shows the generative portrait shadow removal system 102 utilizing the trained shadow removal denoising model to process the combined embedding at a first denoising layer 310 to generate a first denoised representation 312. Further, FIG. 3 shows the generative portrait shadow removal system 102 utilizing the second denoising layer 314 to process the first denoised representation 312 to generate a second denoised representation 316. Moreover, FIG. 3 shows the generative portrait shadow removal system 102 utilizing the Nth denoising layer 318 to process the second denoised representation 316. For instance, the generative portrait shadow removal system 102 combines (e.g., concatenates) vector values generated from the encoder at different layers of the denoising neural networks to generate denoised representations (e.g., modified noise representations).

As shown in FIG. 3, the generative portrait shadow removal system 102 performs an act 308 of combining the latent noise representation 302, the mask 304 of the foreground object, and the input digital image 306 with shadow to generate a combined embedding. In one or more embodiments, the generative portrait shadow removal system 102 modifies the trained shadow removal denoising model to include a multi-channel input layer. Specifically, the generative portrait shadow removal system 102 modifies the trained shadow removal denoising model to include a nine-channel input layer to process the combined embedding. For instance, the latent noise representation 302 amounts to four channels, the latent noise representation 302 amounts to a single channel, and the input digital image 206 amounts to four channels (e.g., the latent features of the input digital image 306), which sums to a nine-channel input layer of the trained shadow removal denoising model.

As shown in FIG. 3, the generative portrait shadow removal system 102 via a first denoising neural network receives the combined embedding. Further, as shown, the first denoising neural network generates a first denoised representation (i.e., a partially denoised digital image) and iteratively repeats this process (10, 20, 50, or 100 times, etc.). For instance, as shown, the generative portrait shadow removal system 102 utilizes a Nth denoising neural network to process the first denoised representation (e.g., or a second, third, or x denoised representation) and generates an Nth denoised representation.

FIG. 3 further illustrates the generative portrait shadow removal system 102 performing an act of conditioning the denoising layers. As also shown, the generative portrait shadow removal system 102 conditionalizes the denoising neural network. For example, FIG. 3 illustrates the generative portrait shadow removal system 102 performing an act 322. In particular, the act 322 includes conditioning each layer of the denoising neural network (e.g., the first denoising layer 310) and the denoising neural network (e.g., the second denoising layer 314).

To illustrate, conditioning layers of a neural network includes providing context to the networks to guide the generation of an image with a shadow removed and with harmonized lighting properties. For instance, conditioning layers of neural networks include at least one of (1) transforming conditioning inputs (e.g., a version of the input digital image) into vectors to combine with the denoising representations; and/or (2) utilizing attention mechanisms which causes the neural networks to focus on specific portions of the input and condition its predictions (e.g., outputs) based on the attention mechanisms. Specifically, for denoising neural networks, conditioning layers of the denoising neural networks includes providing an alternative input to the denoising neural networks (e.g., the downsampled (e.g., low-resolution) version of the input digital image). In particular, the generative portrait shadow removal system 102 provides alternative inputs to provide a guide in removing noise from the diffusion representation (e.g., the denoising process). Thus, the generative portrait shadow removal system 102 conditioning layers of the denoising neural networks acts as guardrails to allow the denoising neural networks to learn how to remove noise from an input signal and produce a clean output.

Specifically, conditioning the layers of the network includes modifying input into the layers of the denoising neural networks to combine with the combined embedding (e.g., the latent noise representation 302, the mask 304 of the foreground object, and the input digital image 306). For instance, the generative portrait shadow removal system 102 combines (e.g., concatenates) vector values generated from the encoder at different layers of the denoising neural networks. For instance, the generative portrait shadow removal system 102 combines one or more conditioning vectors with the noise representation, or the modified noise representation. Thus, the denoising process considers the noise representation and a downsampled version of a representation of the input digital image 306 to generate conditioned images with harmonized lighting and shadows removed.

In some embodiments, the generative portrait shadow removal system 102 uses a version 324 of the input digital image 306 to condition the trained shadow removal denoising model. Specifically, the version 324 of the input digital image includes a resolution of the input digital image 306 different than an initial resolution of the input digital image 306. For instance, a version of the input digital image 306 includes a downsampled version of the input digital image 306 (e.g., a lighting map of the background). In other words, the downsampled version of the input digital image 306 includes a low-resolution version of the input digital image, relative to an initial resolution of the input digital image. To illustrate, the generative portrait shadow removal system 102 utilizes a downsampling model to reduce the resolution of the input digital image 306 by decreasing the number of pixels in the input digital image 306.

In some embodiments, the generative portrait shadow removal system 102 utilizes an image encoder to generate an image embedding of the version 324 of the input digital image 306. Specifically, the generative portrait shadow removal system 102 utilizes the image embedding of the version 324 (e.g., generated via an image encoder 326) of the input digital image 306 to condition layers of the trained shadow removal denoising model to generate the modified digital image 320.

By conditioning layers of the denoising neural networks with the version 324 of the input digital image 306, the generative portrait shadow removal system 102 captures the initial lighting distribution of a background of the input digital image 306 for the foreground object in the modified digital image 320. In some embodiments, an initial lighting distribution of a background of the input digital image 306 includes how light and shadows are arranged within a background scene of the input digital image 306 that affects the overall appearance and focus of the input digital image 306.

In one or more embodiments, the lighting properties of a background includes the characteristics and attributes of the light that illuminates the background of the scene in the input digital image. For instance, the lighting properties of the background includes the intensity/brightness, the color temperature, the lighting direction, the quality of light, the spread/focus of the light, and/or the color of the light.

Similarly, in some embodiments, the lighting properties of the foreground object includes how light and shadow are arranged relative to the foreground object. For instance, the lighting properties of the foreground object includes one or more light sources that affect an appearance of the foreground object, a direction of the one or more light sources on the foreground object, the quality of the light, the intensity of the light, and the lighting ratio of the foreground object.

Thus, the generative portrait shadow removal system 102 generates the modified digital image 320 with the shadow removed and the lighting properties of the foreground object harmonized with the lighting properties of the background. In some embodiments, harmonizing lighting properties of the foreground object with lighting properties of the background includes creating a cohesive illumination of the foreground object that matches the illumination of the background of the input digital image 306.

Specifically, the generative portrait shadow removal system 102 harmonizes lighting properties of the foreground object with lighting properties of the background includes the generative portrait shadow removal system 102 ensuring that lighting sources for the foreground object have the same color temperatures of the background lighting properties. Further, the generative portrait shadow removal system 102 harmonizes lighting properties of the foreground object with lighting properties of the background includes balancing the light intensity of the foreground object with the background and having the same softness and diffusion as the background.

Although not shown in FIG. 3, in one or more embodiments, the generative portrait shadow removal system 102 obtains the mask 304 of the foreground object by leveraging a segmentation model. Specifically, the generative portrait shadow removal system 102 utilizes a segmentation model to identify and classify each pixel in the input digital image 306 into different categories (e.g., background versus foreground object). For instance, the generative portrait shadow removal system 102 utilizes a segmentation model to extract features from the input digital image 306 to classify the pixels of the input digital image based on the extracted features.

Figure 4:
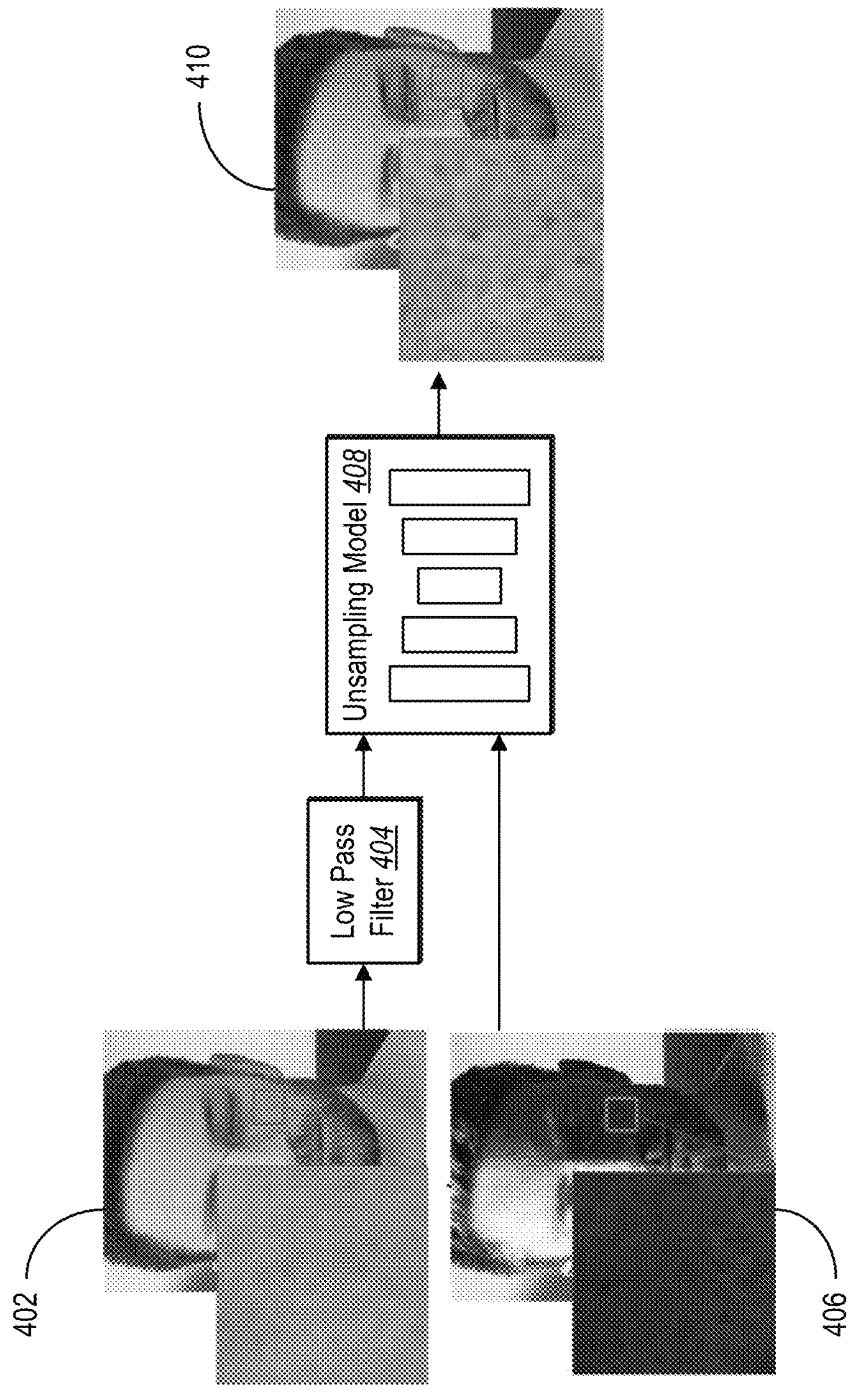
FIG. 4 illustrates a diagram of an example diagram of the generative portrait shadow removal system using an upsampling model to generate a high-resolution version of the modified digital image in accordance with one or more implementations.

As mentioned above, the generative portrait shadow removal system 102 uses an upsampling model to generate a high-resolution version of the modified digital image. FIG. 4 illustrates the generative portrait shadow removal system 102 generating a refined modified digital image with the shadow removed from the portrait digital image in accordance with one or more embodiments.

As shown in FIG. 4, the generative portrait shadow removal system 102 processes a modified digital image 402 (e.g., the modified digital image 320 discussed above in relation to FIG. 3) and an input digital image 406 (e.g., the input digital image 306 discussed above in relation to FIG. 3). For instance, as shown, FIG. 4 depicts the details of the modified digital image 402 compared to the details of the input digital image 406 (e.g., the input digital image 406 contains high-frequency details not present in the modified digital image 402 but it also contains a shadow occluding at least part of the portrait subject). In particular, the details of the modified digital image 402 are lacking texture components and other high-frequency details that are shown in the input digital image 406.

As further shown, the generative portrait shadow removal system 102 utilizes a low pass filter 404 to process the modified digital image 402. In one or more embodiments, the low pass filter 404 includes a processing filter to process signals below an established frequency. In particular, the low pass filter 404 removes high-frequency noise and smooths out signals in the modified digital image 402. In other words, the generative portrait shadow removal system 102 utilizes the low pass filter 404 to smooth out the modified digital image 402 (e.g., removes high-frequency components, relative to a high-frequency threshold).

Moreover, FIG. 4 shows the generative portrait shadow removal system 102 utilizing an upsampling model 408 to process the modified digital image 402 (e.g., after passing through the low pass filter 404) and the input digital image 406. In some embodiments, the upsampling model 408 (e.g., an upsampling network) includes a machine learning model to increase a resolution of a digital image. Specifically, the generative portrait shadow removal system 102 uses the upsampling model 408 to generate new data points to enhance the overall quality or dimensions of the modified digital image 402. To illustrate, the generative portrait shadow removal system 102 utilizes the upsampling model 408 to generate a refined modified digital image 410.

In some embodiments, the refined modified digital image 410 includes the modified digital image 402 (e.g., without the shadow and the lighting properties of the foreground object harmonized with the lighting properties of the background) having the high-frequency details of the input digital image 406. In other words, the generative portrait shadow removal system 102 uses the upsampling model 408 to restore some of the lost details (e.g., lost when removing the shadow) of the input digital image 406.

In some embodiments, high-frequency details include texture (e.g., skin texture), freckles, wrinkles, moles, hair strands, eye details, fabric texture, lip texture, skin pores, irises and eyelashes. For instance, the generative portrait shadow removal system 102 incidentally/inadvertently removes these details upon removing the shadow from the foreground object in the input digital image 406. Thus, the generative portrait shadow removal system 102 uses the upsampling model to restore the high-frequency details that were present in the initial input digital image. Additional details of learning parameters of the upsampling model 408 are given below in the description of FIG. 7.

Figure 5:
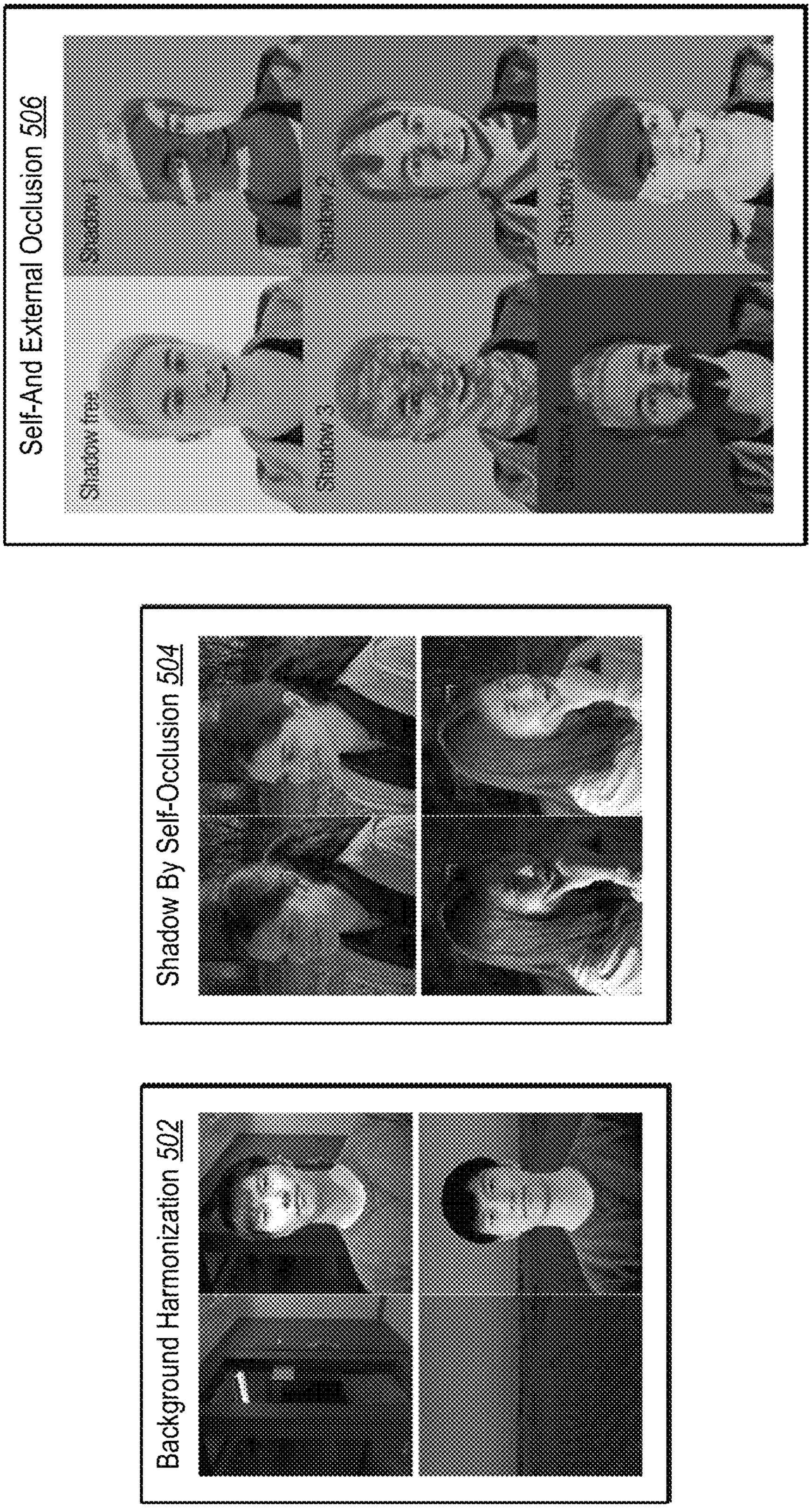
FIG. 5 illustrates a diagram of an image dataset that includes a variety of digital image types utilized by the generative portrait shadow removal system in accordance with one or more implementations.

As mentioned above, the generative portrait shadow removal system 102 generates an image dataset specially tailored for optimizing background harmonization and shadow removal. FIG. 5 illustrates the generative portrait shadow removal system 102 generating an image dataset that includes a variety of digital image types in accordance with one or more embodiments.

As mentioned, a shadow includes a dark area or shape cast onto a surface from an object blocking a source of light. In some embodiments, the shadow is cast from an external object, an internal object or a self-occlusion. In some embodiments, an external object includes an object outside of a digital frame of the input digital image. Specifically, an external object is not visible in the input digital image, but the external object blocks a source of light and casts a shadow on the foreground object in the input digital image.

In some embodiments, an internal object includes an object at least partially within a digital frame of the input digital image. Specifically, an internal object is at least partially visible in the input digital image and blocks a source of light and casts a shadow on the foreground object in the input digital image. In some embodiments, a self-occlusion includes the foreground object with the shadow occlusion at least partially causing the shadow to be cast on itself. Specifically, the foreground object itself blocks a light source and causes at least a partial occlusion of the foreground object. Thus, FIG. 5 illustrates the generative portrait shadow removal system 102 generating a curated image dataset to utilize for fine-tuning a pre-trained text-guided image generation model.

In one or more embodiments, the generative portrait shadow removal system 102 collects data from a lightstage (e.g., portrait images under diverse lighting and background scenes), synthetic humans, and simulations with real data. For instance, the data from the lightstage is designed for background harmonization and shadow removal of the person under the self-occluded shadow. Further, the synthetic and simulated data is designed for background harmonization and shadow removal for both self-occlusions and external shadows (e.g., stark shadows cast by another occluding object).

In one or more embodiments, the generative portrait shadow removal system 102 collects a set of One-Light-at-A-Time (OLAT) images for 150 unique subjects with varying pose and clothes. Moreover, the OLAT data includes four camera views and 160 LED lights. Furthermore, the generative portrait shadow removal system 102 utilizes a high-speed camera to record the reflectance field of the subject at five-megapixel resolution and an exposure time of 20 ms.

Further, in one or more embodiments, the generative portrait shadow removal system 102 relights the OLAT images using diverse HDR (high-definition resolution) environment maps and HDR bracketed captures using a high end 360-degree camera designed for capturing immersive photos and videos. In particular, the generative portrait shadow removal system 102 projects and tonemaps (e.g., convert a wide range of luminance values in high dynamic range images to a more limited range) an environment map to obtain a background image and its reference relit portrait. For instance, the generative portrait shadow removal system 102 performs the projecting and tone mapping twice to yield pairs of portrait and background images ready for background harmonization (e.g., shown as background harmonization 502).

In one or more embodiments, the generative portrait shadow removal system 102 also generates a shadow-free portrait image. For instance, the generative portrait shadow removal system 102 renders the OLAT portraits with an energy-preserved blurred version of the environment map to minimize self-occluded shadows and diffuse the lighting, while keeping global lighting such as ambient occlusions (e.g., shown as shadow by self-occlusion 504).

Moreover, in one or more embodiments, the generative portrait shadow removal system 102 utilizes a few hundred synthetic humans and renders shadows using point-light-based ray tracing. Specifically, given a synthetic three-dimensional portrait model, the generative portrait shadow removal system 102 randomly places a point light in front of the subject where the generative portrait shadow removal system 102 also puts a random object in between the portrait and lighting so that it simulates occlusions (e.g., shown as self and external occlusion 506).

Additionally, in one or more embodiments, the generative portrait shadow removal system 102 collects twenty-five thousand images of portrait images, which mainly contain self-occluded and soft shadows with minimum external occlusions on the body. Further, the generative portrait shadow removal system 102 applies an intermediate shadow removal model (e.g., which learns only from lightstage and synthetic human data) to the twenty-five thousand images and then leverage the outputs as pseudo ground truth images for shadow-free images. For instance, the intermediate shadow removal models perform robustly for the portrait images with soft and self-occluded shadows.

By adding a novel shadow synthesized with three-dimensional point lighting simulation (similar to the process used in generating the synthetic humans) onto the original input images, the generative portrait shadow removal system 102 constructs the noise portrait images with synthetic shadows. During shadow simulation, the generative portrait shadow removal system 102 utilizes geometry information from monocular depth and surface normal detection models.

As mentioned above, the generative portrait shadow removal system 102 repurposes a pretrained text-to-image diffusion model via multiple fine-tuning steps. Specifically, the generative portrait shadow removal system 102 optimizes parameters of a pretrained text-to-image diffusion model by first fine-tuning the pretrained text-to-image diffusion model to harmonize the lighting and color of the foreground with a background scene. Additionally, the generative portrait shadow removal system 102 performs a second fine-tuning step to optimize parameters of the pre-trained text-to-image diffusion model to generate a shadow-free portrait image.

Figure 6A:
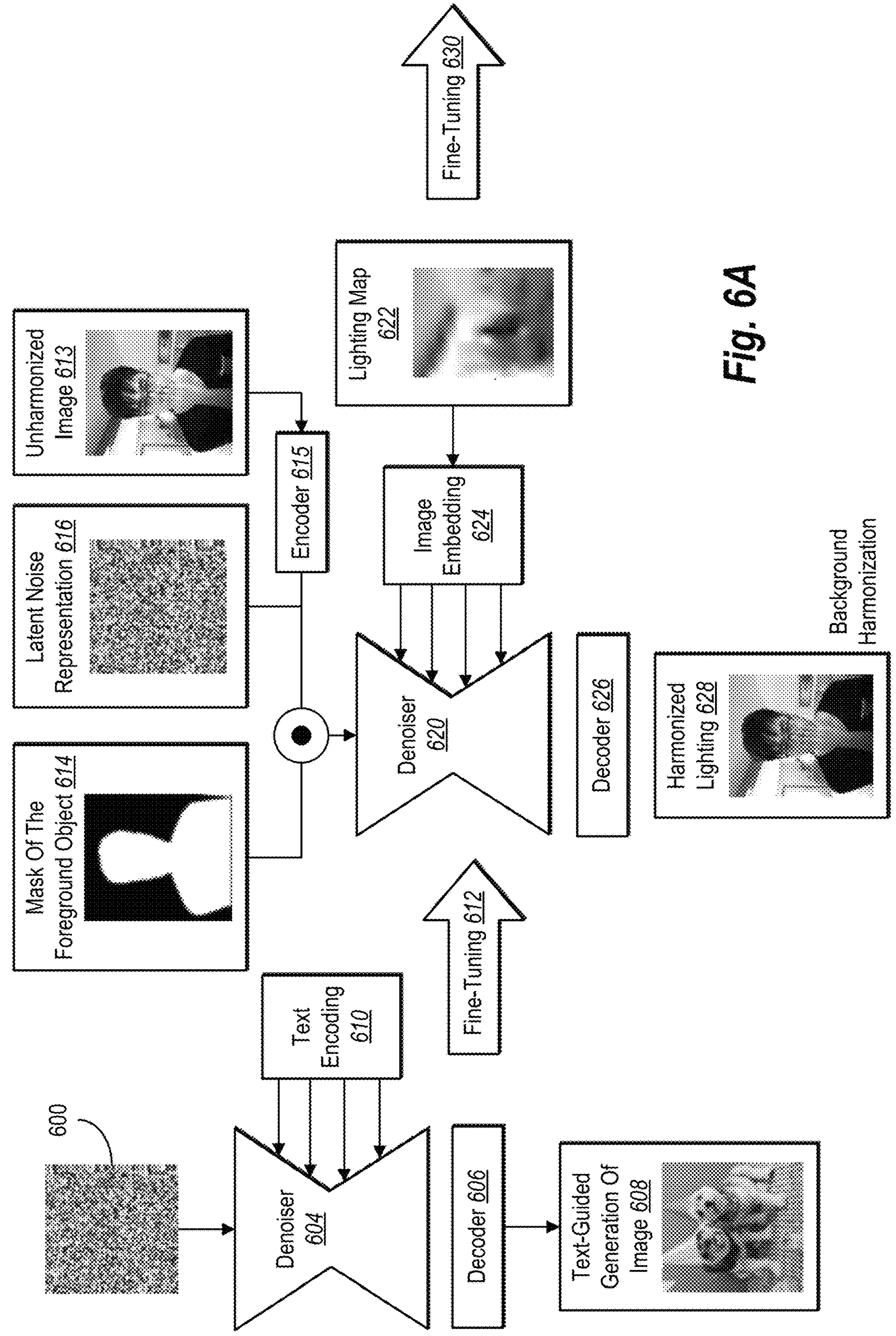
FIG. 6A illustrates a diagram of the generative portrait shadow removal system performing a first fine-tuning step to generate parameters for a background harmonization denoising model in accordance with one or more implementations.

Thus, the generative portrait shadow removal system 102 performs multiple fine-tuning steps on a pre-trained text-guided image generation model. FIG. 6A illustrates the generative portrait shadow removal system 102 performing a first fine-tuning step to generate parameters for a background harmonization denoising model. As mentioned, the generative portrait shadow removal system 102 utilizes a diffusion neural network. In particular, during training of the diffusion neural network, a diffusion neural network receives as input a digital image and adds noise to the digital image through a series of steps. FIG. 6A illustrates the generative portrait shadow removal system 102 fine-tuning parameters of a pre-trained text-guided image generation model. Specifically, the pre-trained text-guided image generation model takes a latent noise representation 600 and utilize a denoiser 604 to process the latent noise representation 600. Moreover, the pre-trained text-guided image generation model is conditioned on a text encoding 610 (e.g., a text prompt) to generate a text-guided generation of an image 608 by using a decoder 606. For instance, the prompt could read "cute fluffy dogs in cone caps at a birthday celebration."

In one or more embodiments, the generative portrait shadow removal system 102 trains a diffusion model to produce an image through a process of denoising a noise map. For instance, as mentioned above, the training procedure involves both a forward and a backward step. In particular, in the forward step, it constructs intermediate noise images by gradually adding Gaussian noise to the noise-free data under a Markovian chain, represented as:

$$x_t = \sqrt{\overline{\alpha}_t x_0} + \sqrt{1-\overline{\alpha}_t \epsilon}$$

Where $\in$~N(0,1) is the Gaussian noise, $x_0$ is a clean image, $x_1$ is the latent noise representation at time step t, and $\overline{a}_t$ is computed from a fixed variance schedule.

Moreover, in some embodiments, the generative portrait shadow removal system 102 extends the forward process to latent images, represented as:

$$z_t = \sqrt{\overline{\alpha}_t z_0} + \sqrt{1-\overline{\alpha}_t \epsilon}$$

Where $z_0$ is the latent features extracted by a pre-trained image encoder network and $z_t$ is the noise latent features at time t. Moreover, in the backward process, a denoiser (e.g., a U-Net) is trained to construct a clean image by generating the noise at a time step t with the following objectives:

$$\mathcal{L} = \mathbb{E}_{z_0, \epsilon \sim N, t}\left[\|\epsilon - \epsilon_\theta(z_t, t)\|_2^2\right]$$

Where $\in_\theta(\bullet)$ is the noise prediction function.

In one or more embodiments, the generative portrait shadow removal system 102 utilizes two methods to control the local and global properties of the image generation from $\in_\theta(\bullet)$. For instance, the generative portrait shadow removal system 102 utilizes a local control, which is similar to a conditional diffusion framework. In particular, the generative portrait shadow removal system 102 utilizes a spatially aligned conditional map to contribute its local information (e.g., edges and pose map) to the generated images by concatenating the conditional map with the latent noise representation $z_t$, i.e., $z_t \rightarrow \{z_t, L\}$ where $LL \in \mathbb{R}^{W\times H\times N}$.

In one or more embodiments, the generative portrait shadow removal system 102 utilizes spatially aligned conditional map to borrow some local information from L to replace such properties in the output. For instance, the generative portrait shadow removal system 102 extends the local condition to the latent space by utilizing a variational autoencoder to guide the local properties of the image generation i.e., $\{z_t, L\} \rightarrow \{z_t, z_L\}$ where $z_L$ is the time-invariant latent images encoded by the variational autoencoder.

In one or more embodiments, the generative portrait shadow removal system 102 utilizes a global control that includes global properties such as semantics, text, and lighting of a scene. For instance, the generative portrait shadow removal system 102 conditions a scene on the denoiser $\in_\theta$ in an embedding space of a global conditional variable G using subspace embedding modules for text and for images. Unlike local controls, the global variables are not spatially aligned, and therefore, they are often conditioned via an attention mechanism (e.g., a cross-attention mechanism) to allow the denoiser to find the correspondences between its intermediate features and global conditioning.

In one or more embodiments, the backward denoising process considers the local and global control signals by minimizing the following objectives:

$$\mathcal{L} = \mathbb{E}_{z_0, \epsilon \sim N, t}\left[\|\epsilon - \epsilon_\theta(\{z_t, L\}, t, \tau(G))\|_2^2\right]$$

Where $\tau(\bullet)$ is the subspace embedding function that projects the global control variable to the latent space. Specifically, the generative portrait shadow removal system 102 learns the objective in a compositional way to develop a foundational generative model for portrait shadow removal.

As shown in FIG. 6A, the generative portrait shadow removal system 102 takes the pre-trained text-guided image generation model and performs an act 612 of fine-tuning to learn/optimize parameters for background harmonization.

As shown, the generative portrait shadow removal system 102 takes the pre-trained text-guided image generation model and replaces an input layer with a multi-layer channel (discussed above) to process a combined embedding of a mask 614 of a foreground object (e.g., a first training foreground object), a latent noise representation 616 (e.g., a first latent noise training representation), and an input digital image (e.g., an unharmonized digital image 613). Specifically, the unharmonized digital image 613 includes a digital image with the background lighting properties not synchronized or optimized with the lighting properties of the foreground object. For instance, the generative portrait shadow removal system 102 utilizes an encoder 615 to generate an embedding of the unharmonized digital image 613.

As shown, the generative portrait shadow removal system 102 processes the combined embedding with a denoiser 620 and conditions layers of the denoiser 620 with an image embedding 624 of a lighting map 622. In some embodiments, the lighting map 622 acts as a downsampled version of the input digital image (e.g., low-resolution) that captures the background lighting properties of the unharmonized digital image 613. From the denoising process, the generative portrait shadow removal system 102 optimizes parameters of the pre-trained text-guided image generation model (e.g., to be optimized for background harmonization).

In other words, the generative portrait shadow removal system 102 generates a background harmonization denoising model from fine-tuning parameters of a pre-trained diffusion model (e.g., based on the combined embedding and conditioning layers of the denoiser 620 with the lighting map 622). From using the denoiser 620, the generative portrait shadow removal system 102 generates a digital image with harmonized lighting 628 (e.g., the lighting of the foreground object harmonized with the lighting of the background) by using a decoder 626.

In one or more embodiments, the generative portrait shadow removal system 102 fine-tunes the pre-trained text-guided image generation model to predict the noise that generates a clean portrait image (e.g., which harmonizes foreground lighting with lighting from a background scene) by optimizing the following objectives:

$$\mathcal{L} = \mathbb{E}_{z_0, y, \epsilon \sim N, t}\left[\|\epsilon - \epsilon_\theta(\{z_t, z_L, M\}, t, \tau(G))\|_2^2\right]$$

Where $M \in \mathbb{R}^{W\times H\times N}$ is the downsampled foreground mask, which is directly concatenated with the latent noise representation $z_t$ to guide the attention of the foreground region during the denoising process. For instance, $z_L$ is the time-invariant conditional latent features projected from the input harmonized image L using a variational autoencoder. $z_L$ thus shares a common latent space with $z_t$. Moreover, G is the background image that guides the global illumination in the embedding space projected from an image embedding model (e.g., to generate the image embedding).

Moreover, the generative portrait shadow removal system 102 generate the unharmonized digital image 613 (L) by composing the original foreground image with a novel background. Specifically, the generative portrait shadow removal system 102 utilizes the downsampled background image of G as a lighting map. Furthermore, to support the different channel numbers of the denoiser $\in_\theta$ from the pretrained text-guided image generation model, the generative portrait shadow removal system 102 changes the first layer of the network to match the input modality for background harmonization. For instance, the clean latent space $z_0$ is constructed by projecting the ground-truth harmonized data (captured from lightstage) using a variational autoencoder.

Figure 6B:
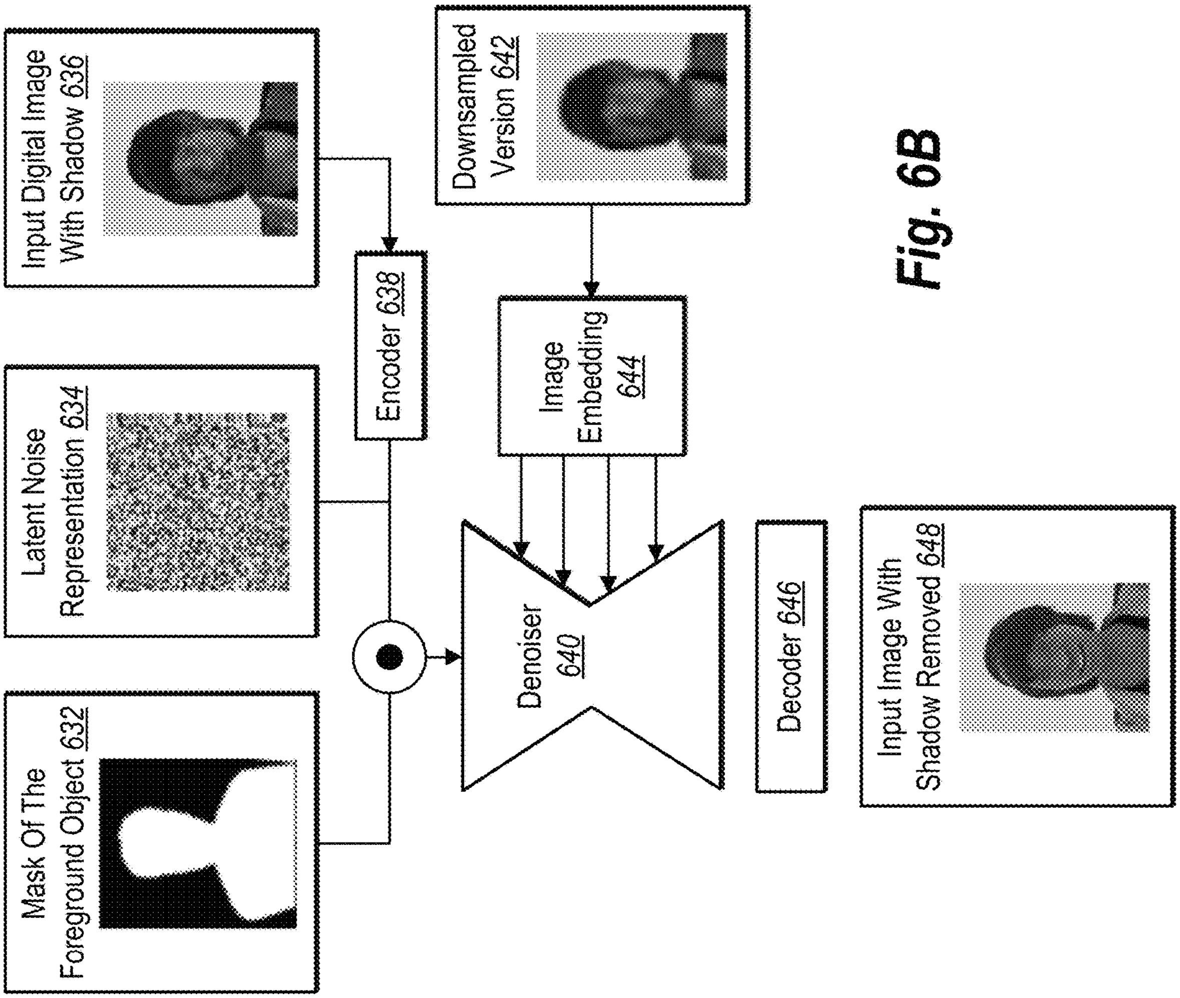
FIG. 6B illustrates a diagram of the generative portrait shadow removal system performing a second fine-tuning step to generate parameters for a shadow removal denoising model in accordance with one or more implementations.

As shown in FIG. 6A, the generative portrait shadow removal system 102 further performs an act 630 of additional fine-tuning. FIG. 6B illustrates the second fine-tuning step to generate parameters for a shadow removal denoising model (e.g., the generative portrait shadow removal system 102 further fine-tunes the background harmonization denoising model).

Specifically, the generative portrait shadow removal system 102 combines a mask 632 of a foreground object (e.g., an additional training mask of a second training foreground object), a latent noise representation 634 (e.g., a second training latent noise representation), and an input digital image 636 with a shadow (e.g., a training digital image with a shadow occlusion) to generate a combined embedding. For instance, the generative portrait shadow removal system 102 utilizes an encoder 638 to generate an embedding of the input digital image 636 to combine with the mask 632 and the latent noise representation 634. As further shown, the generative portrait shadow removal system 102 generates an image embedding 644 from a downsampled version 642 of the input digital image 636 (e.g., to capture the background lighting properties of the input digital image 636).

As shown in FIG. 6B, the generative portrait shadow removal system 102 utilizes a denoiser 640 to generate a digital image 648 with the shadow removed from the combined embedding and conditioning layers of the denoiser 640 with the image embedding 644 (e.g., by utilizing a decoder 646). From this process, the generative portrait shadow removal system 102 generates parameters of the shadow removal denoising model.

In one or more embodiments, the generative portrait shadow removal system 102 generates the parameters of the shadow removal denoising model which minimizes disturbing shadows and highlights. For instance, the generative portrait shadow removal system 102 minimizes the objective of:

$$\mathcal{L} = \mathbb{E}_{z_0,,y,\epsilon\sim\mathcal{N},t}\left[\|\epsilon - \epsilon_\theta(\{z_t, z_L, M\}, t, \tau(G))\|_2^2\right]$$

Specifically, the generative portrait shadow removal system 102 minimizes the above objective while switching the local and global conditional variables. Specifically, the generative portrait shadow removal system 102 uses the input portrait image with shadows and highlights to construct time-invariant local conditional features $z_L$. Furthermore, the generative portrait shadow removal system 102 uses the shadow-free portrait image to construct the ground-truth latent features $z_0$.

In one or more embodiments, for the global conditional variable G, the generative portrait shadow removal system 102 uses the downsampled image from the input portrait image L as a lighting image. For instance, during repurposing for shadow removal, the generative portrait shadow removal system 102 uses a smaller learning rate than the one used for background harmonization to minimize catastrophic forgetting underlying the sequential learning problem (e.g., a model trained on a sequence of tasks forgets previously learned tasks upon learning new ones). Thus, at inference time, the generative portrait shadow removal system 102 generates shadow-free portrait images that are well-harmonized with background scenes by effectively preserving the original lighting distribution from the input image.

Although FIGS. 6A-6B shows the generative portrait shadow removal system 102 performing the fine-tuning for background harmonization and shadow removal separately, in one or more embodiments, the generative portrait shadow removal system 102 performs the fine-tuning for background harmonization and shadow removal together.

Figure 7:
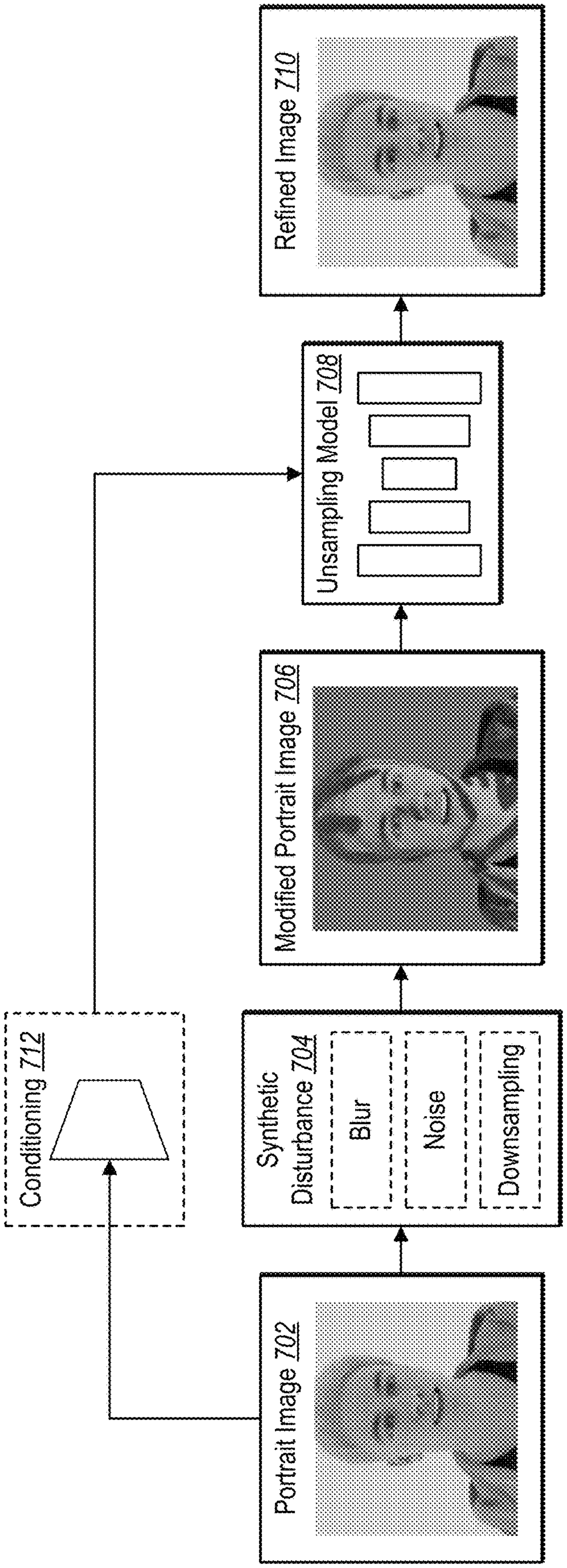
FIG. 7 illustrates a diagram of the generative portrait shadow removal system generating parameters for an upsampling model in accordance with one or more implementations.

As mentioned above, the generative portrait shadow removal system 102 generates parameters of an upsampling model for generating a refined modified digital image. FIG. 7 illustrates the generative portrait shadow removal system 102 adding synthetic disturbances to a portrait image to generate parameters of an upsampling model in accordance with one or more embodiments.

In one or more embodiments, due to the nature of the denoising process of a generative diffusion model (e.g., discussed above in FIGS. 2-6B) the loss of high-frequency details (e.g., pore, wrinkles, clothing patterns) is often unavoidable. Therefore, as a post-processing at inference time, the generative portrait shadow removal system 102 utilizes the upsampling model, which is a lightweight guided upsampling model that restores original details of the portrait image while keeping the predicted shadow distribution. For instance, restoring the high-frequency details is represented as, $$I_{refined} = f(I_{input}, l(I_{generation}))$$

Where f is the upsampling function designed with a small local prediction network, and I(•) is the low pass filter (e.g., a Gaussian filter). Moreover, $I_{generation}$ is the generated shadow-free image from the trained shadow removal denoising model, and $I_{input}$ is the input image with shadows.

In one or more embodiments, shadows are typically associated with low-frequency components of an image to represent overall lighting distribution, and a network learns to combine the low-frequency components from a shadow-free image and high-frequency details from an original input image. Specifically, the generative portrait shadow removal system 102 utilizes a residual network and learns from the lightstage data (e.g., discussed above in FIG. 5). For instance, given a portrait image under a specific lighting condition, the generative portrait shadow removal system 102 adds synthetic disturbances such as blur, noise and down-sampling (e.g., as mentioned above and shown in FIG. 7).

To illustrate, the generative portrait shadow removal system 102 utilizes an upsampling model 708 to predict the original image conditioned on the clean portrait image under different lighting conditions. Moreover, the generative portrait shadow removal system 102 utilizes loss functions such as L2 (mean squared error loss), and common loss functions for VGG (visual geometry group) and GAN (generative adversarial networks).

As shown in FIG. 7, the generative portrait shadow removal system 102 receives a portrait image 702 (e.g., a ground truth image) and performs an act 704 of adding one or more synthetic disturbances. For instance, the synthetic disturbances (e.g., perturbing) include the generative portrait shadow removal system 102 blurring, adding noise, or downsampling the portrait image 702. As shown, from the synthetic disturbances, the generative portrait shadow removal system 102 generates a modified portrait image 706.

Moreover, the generative portrait shadow removal system 102 utilizes the upsampling model 708 to process the modified portrait image 706. Furthermore, the generative portrait shadow removal system 102 performs an act 712 of conditioning the upsampling model 708 with the portrait image 702 to generate a refined image 710.

Figure 8A:
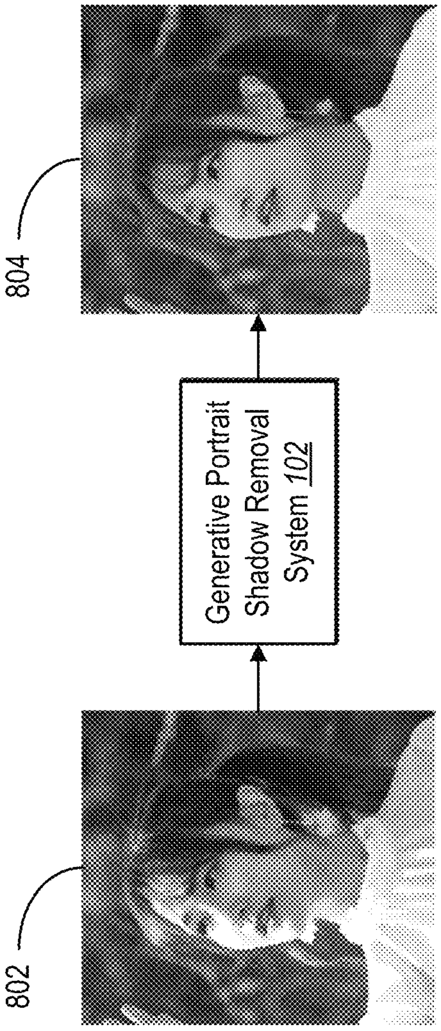
FIGS. 8A-8D illustrates a diagram of results of the generative portrait shadow removal system performing shadow removal in accordance with one or more implementations.

FIGS. 8A-8D illustrates example diagrams of the generative portrait shadow removal system 102 generating portrait images without shadows. For instance, FIG. 8A shows an input digital image 802 with shadows cast on a right portion of the subject (e.g., from a self-occlusion). Furthermore, FIG. 8A shows that by processing the input digital image 802 with the generative portrait shadow removal system 102, the generative portrait shadow removal system 102 generates a modified digital image 804 with the shadow removed and the lighting on the subject (e.g., the foreground object) matching the lighting of the background (e.g., harmonized).

Figure 8B:
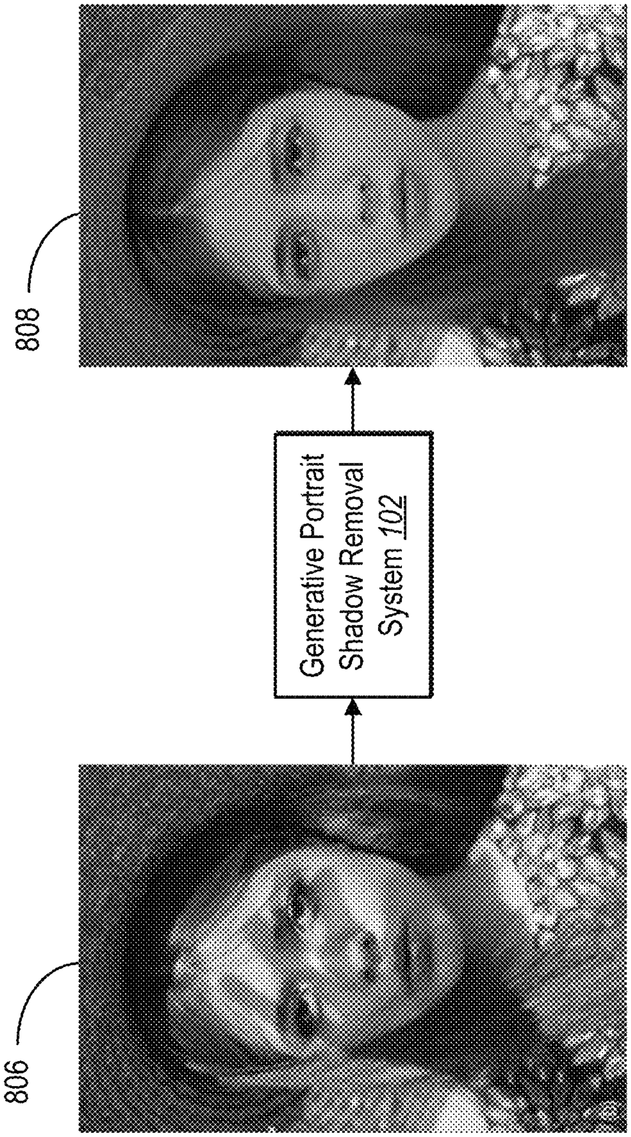

FIG. 8B shows an input digital image 806 with an external shadow occlusion. In particular, the external shadow occlusion comes from a hand outside of the digital frame of the input digital image 806 (e.g., the subject in the input digital image 806 is taking a selfie, and the subject's hand causes the shadow occlusion). Further, FIG. 8B shows the generative portrait shadow removal system 102 receiving the input digital image 806 and generating a modified digital image 808. Specifically, the modified digital image 808 does not have the external shadow occlusion and the lighting on the subject's face matches the background of the input digital image 806.

Figure 8C:
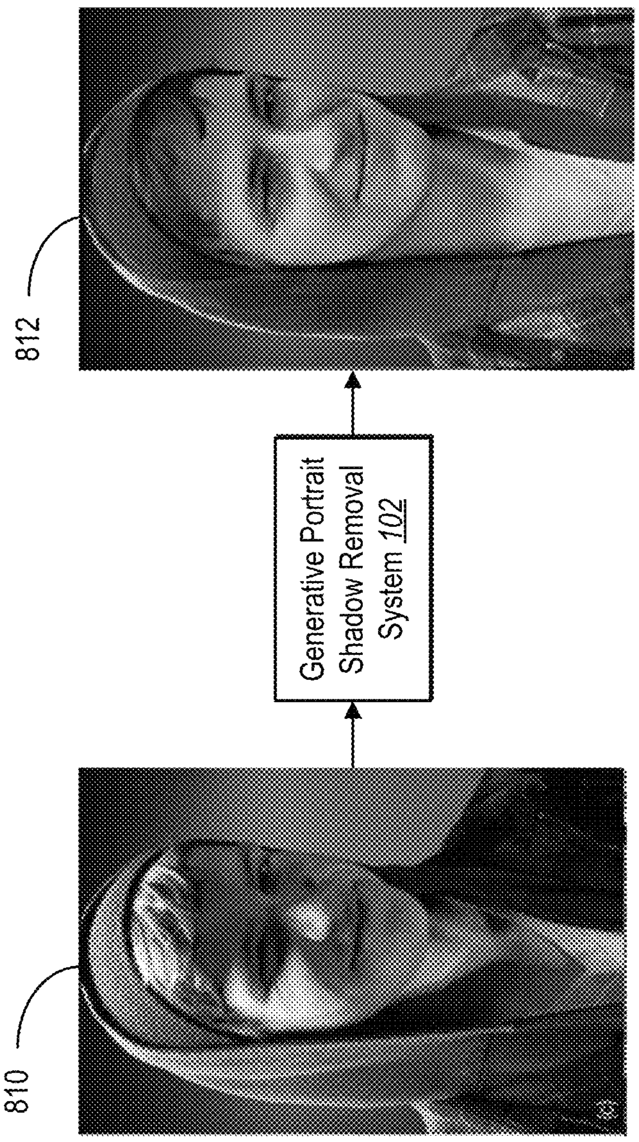

FIG. 8C shows an input digital image 810 with a shadow occlusion (e.g., an internal occlusion or self-occlusion) on the subject's face. In particular, the subject in the input digital image 810 is likely blocking a light source, thus causing the shadow to be cast on the subject's face. Furthermore, FIG. 8C shows the generative portrait shadow removal system 102 receiving the input digital image 810 and removing the shadow occlusion from the subject's face while harmonizing the lighting of the subject's face with the background lighting to generate a modified digital image 812.

Figure 8D:
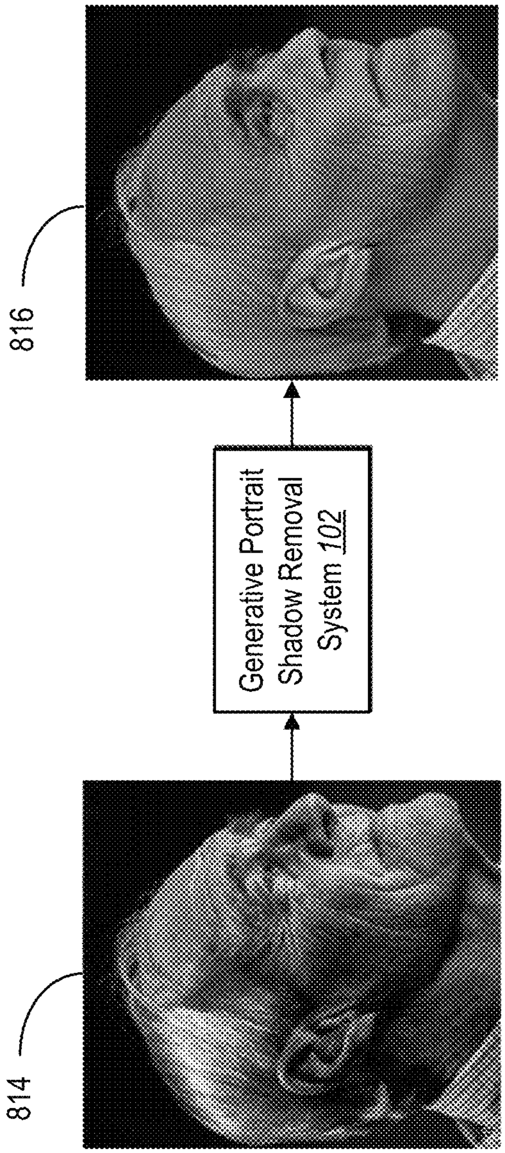

FIG. 8D shows an input digital image 814 with a shadow occlusion and further shows high-resolution details of the subject's face (e.g., wrinkles and the detailed skin texture). Furthermore, FIG. 8D shows the generative portrait shadow removal system 102 receiving the input digital image 814 and removing the shadow occlusion from the subject's face while harmonizing the lighting of the subject's face with the background lighting. Moreover, FIG. 8D shows the generative portrait shadow removal system 102 preserving the high-frequency details of the input digital image 814 in the modified digital image 816.

Figure 9:
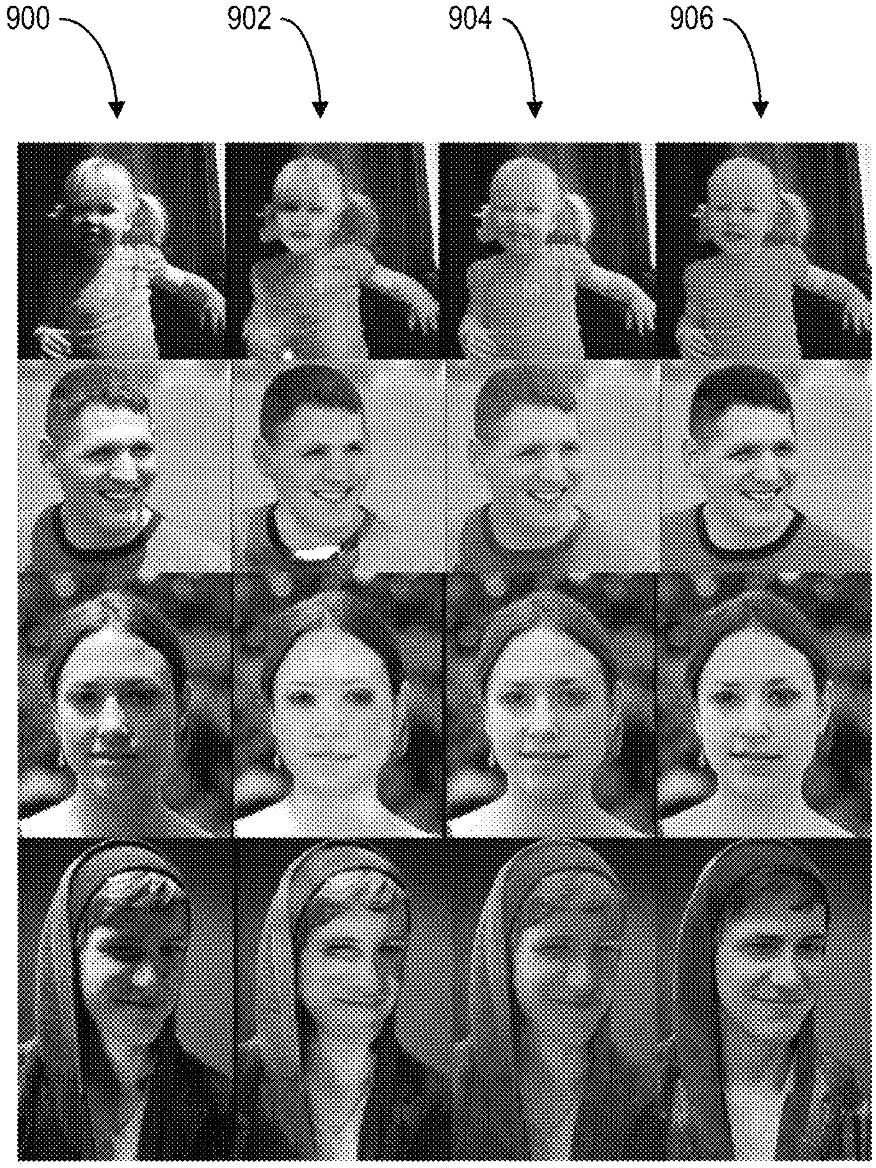
FIG. 9 illustrates a diagram of prior systems performing shadow removal compared with the generative portrait shadow removal system performing shadow removal in accordance with one or more implementations.

FIG. 9 illustrates a qualitative comparison of the generative portrait shadow removal system 102 removing shadows from a portrait digital image compared with prior systems. Specifically, FIG. 9 shows a first column 900 depicting input portrait digital images, where each of the input portrait digital images include a shadow occlusion obstructing at least part of the subject's face.

Moreover, FIG. 9 shows a second column 902 depicting a first prior system generating images with the shadows removed. As depicted in the second column 902 (starting from the top), the first image and the second image show the shadow mostly removed but with an unnatural lighting on the subject's face (e.g., relative to the background lighting). Furthermore, the second column 902 further shows a third image where the shadow is removed but the subject's skin tone contains an unnatural tinge (relative to the input digital image and the background) and further contains blur artifacts. Moreover, the second column 902 shows a fourth image where the shadow is not completely removed from the subject's face, and for the portions where the shadow is removed, the subject has an unnatural skin tone.

In addition, FIG. 9 shows a third column 904 depicting a second prior system generating images with the shadows removed. As depicted in the third column (starting from the top), the first image and the second has the shadow mostly removed, however there are still some unnatural artifacts present on the subject's face. Moreover, for the third and fourth image in the third column 904, the shadow is either not completely removed or the lighting on the subject's face does not naturally match the background lighting.

In contrast, FIG. 9 shows a fourth column 906 that depicts the generative portrait shadow removal system 102 removing shadows from the input digital images. Specifically (starting from the top), the fourth column 906 shows the first digital image with the shadows completely removed and the lighting harmonized with the background. Moreover, the second digital image and the third digital image of the fourth column 906 also shows a much more natural shadow removal and lighting of the subject's face. Lastly, the fourth digital image of the fourth column 906 shows a clear improvement over prior systems in removing the shadows from the subject's face and harmonizing the lighting on the subject's face with the background lighting.

In one or more embodiments, the generative portrait shadow removal system 102 performs extensive quantitative and qualitative comparisons of the generative portrait shadow removal system 102 with existing portrait shadow removal methods. Further, in some embodiments, the generative portrait shadow removal system 102 further performs ablation studies. For instance, experimenters construct multiple validation and testing sets. For example, for validating the generative portrait shadow removal system 102 and additional systems with full ground truth, experimenters collect the data from the lightstage and synthetic humans.

To illustrate, experimenters capture OLAT images of many new subjects and render the portrait images under a novel lighting distribution using unseen panorama environment maps whose corresponding shadow-free portrait images are rendered using the diffused panorama environment maps (described above). For instance, the images include portrait shadow by self-occlusion. Moreover, to validate the robustness of the generative portrait shadow removal system 102 to the external shadows, experimenters newly create a synthetic data using graphics simulations where experimenters used unseen subjects and masks to render the portrait images under novel external shadows.

Furthermore, for testing, experimenters collect multiple real-world portrait scenes from existing stock data and the experimenters also test the generative portrait shadow removal system 102 and additional models on the real-world data. For instance, experimenters use two metrics to measure the robustness of the shadow removal: learned perceptual image patch similarity, hereinafter referred to as LPIPS (e.g., which measures the perceptual similarity between the ground-truth shadow-free images and the predictions) which measures the global shadow distributions and structural similarity index measure, hereinafter referred to as SSIM (e.g., which scores the structure similarity between the ground truth and the prediction) which emphasizes the local properties of images such as color and high-frequency details. In some embodiments, the experimenter's focus is on the foreground, thus, experimenters composite the prediction with the ground-truth background before measuring the scores.

In one or more embodiments, experimenters train the generative portrait shadow removal system 102 and additional systems on the curated dataset by minimizing L1, VGG, and GAN losses. For instance, for qualitative comparisons, experimenters compare the methods of the generative portrait shadow removal system 102 with prior systems using their respective precomputed results.

| | GridNet | UNet | ResNet | HRNet | TFNet | Ours |
|---|---|---|---|---|---|---|
| SSIM | 0.828 | 0.841 | 0.831 | 0.829 | 0.834 | 0.883 |
| LPIPS | 0.156 | 0.143 | 0.157 | 0.156 | 0.137 | 0.093 |

The above table 1 summarizes quantitative results among different methods. As shown in the above table 1, the generative portrait shadow removal system 102 outperforms other methods by a large margin. The generative portrait shadow removal system 102 predicts the underlying appearance of shadow-free portraits in a globally coherent (low LPIPS) way, while effectively preserving the local appearance properties (high SSIM) such as details and colors.

Moreover, as mentioned, in some embodiments, experimenters further perform ablation studies to explore the importance of the different components in the generative portrait shadow removal system 102. For instance, experimenters explore the importance of 1) joint learning (train the model using the background harmonization and portrait shadow removal data together), and 2) learning without harmonization.

| | Joint | w/o Harmonization | w/o Upsampling | Ours |
|---|---|---|---|---|
| SSIM | 0.837 | 0.880 | 0.866 | 0.883 |
| LPIPS | 0.136 | 0.0975 | 0.090 | 0.093 |

The above table 2 illustrates that mixing harmonization and shadow removal data largely drops the performance. For instance, the training of two different tasks at the same time results in suboptimal shadow removal quality. Without harmonization shows meaningful gaps with the full model in terms of perceptual scores (LPIPS), which means that training with harmonization data strengthens the modeling of global shadow distribution by learning the appearance of many portraits under different lighting conditions. To illustrate, compared with "without harmonization," the full method described above for generative portrait shadow removal system 102 is effective to model the globally coherent shadow-free appearance that matches the background distribution.

Moreover, in some embodiments, experimenters study the importance of upsampling. For instance, without applying guided upsampling (shown above in table 2), the results with guided upsampling (e.g., the generative portrait shadow removal system 102, indicated as "Ours" in table 2) performs the best in terms of SSIM. For instance, table 2 indicates that the local details (wrinkles and clothing textures) of the results with upsampling have better matches than the ones without upsampling. Further, such high-frequency details are crucial for production-level applications since they are highly correlated to the identity.

In some embodiments, experimenters further study how each shadow removal dataset contributes to the appearance modeling. For instance, experimenters explore the importance of 1) learning from lightstage (only light) by training the model with only lightstage data with real humans, 2) learning from synthetic humans by only using synthetic humans and shadows for training, and 3) learning without real data by not training the model with data from real humans.

| | Only light | Only synth | w/o Real | Ours |
|---|---|---|---|---|
| SSIM | 0.843 | 0.871 | 0.882 | 0.883 |
| LPIPS | 0.1327 | 0.1086 | 0.0934 | 0.0933 |

The above table 3 summarizes the performance for each dataset ablation. For only light, the large gaps with the generative portrait shadow removal system 102 are in LPIPS score. This indicates that the synthetic human datasets with perfect ground-truth pairs are useful to develop the shadow removal portion of the model. Further, the model learned only from lightstage data often includes highlighting artifacts that mimic the one-point lighting in the lab environment. Moreover, table 3 further shows that generation results from a model that only uses synthetic humans often looks fake, and it sometimes completely changes the color distribution for a specific body part (e.g., hair). Further, while the quantitative gains by learning from real data with pseudo ground truth is marginal in terms of SSIM, its qualitative gains are sometimes significant (e.g., the generative portrait shadow removal system 102 learned with real data handles diverse input shadow styles and identities (e.g., skin colors) better than prior systems).

Figure 10:
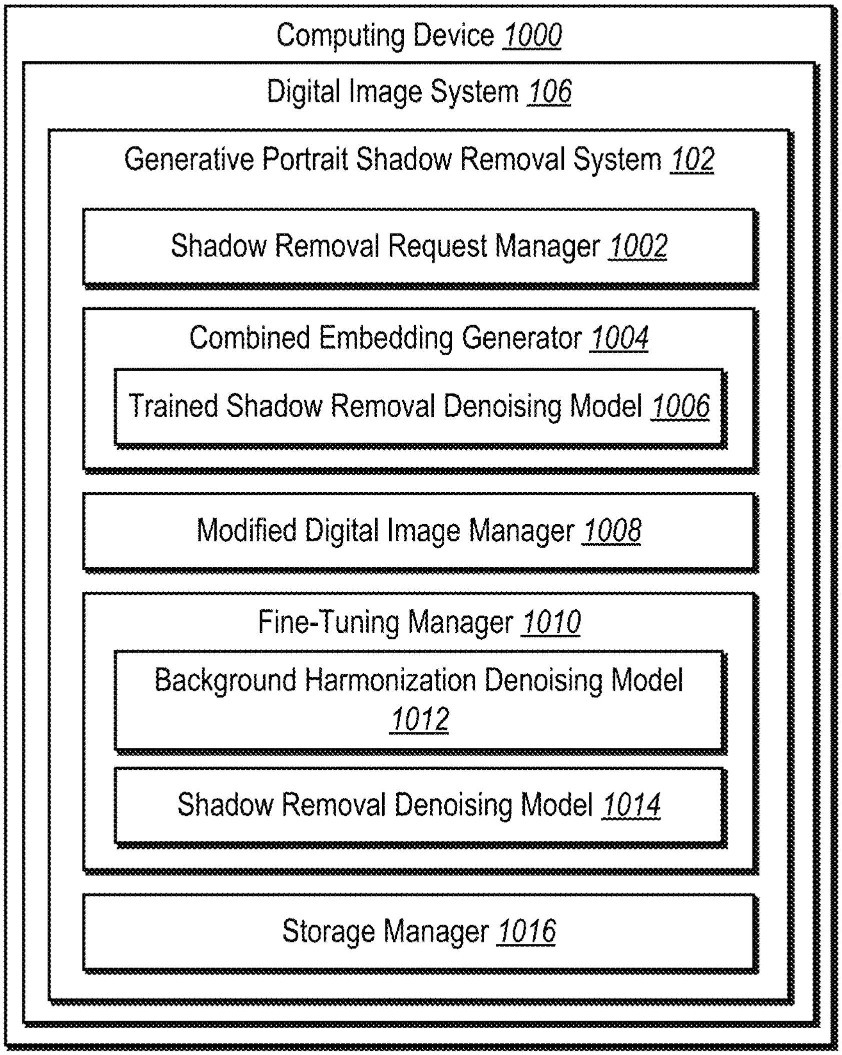
FIG. 10 illustrates a schematic diagram of the generative portrait shadow removal system in accordance with one or more implementations.

Turning to FIG. 10, additional detail will now be provided regarding various components and capabilities of the generative portrait shadow removal system 102. In particular, FIG. 10 illustrates an example schematic diagram of a computing device 1000 (e.g., the server(s) 104 and/or the client device 112) implementing the generative portrait shadow removal system 102 in accordance with one or more embodiments of the present disclosure for components 1000-1016. As illustrated in FIG. 10, the generative portrait shadow removal system 102 includes a shadow removal request manager 1002, a combined embedding generator 1004, a trained shadow removal denoising model 1006, a modified digital image manager 1008, a fine-tuning manager 1010, a background harmonization denoising model 1012, a shadow removal denoising model 1014, and a storage manager 1016.

The shadow removal request manager 1002 receives requests from client devices. For example, the shadow removal request manager 1002 provides to a client device an option to submit a shadow removal request. Furthermore, the shadow removal request manager 1002 also provides as part of submitting the request, an option to submit a digital image. For instance, the shadow removal request manager 1002 detects a received shadow removal request and a digital image that contains a portrait subject and a shadow occluding at least part of the portrait subject.

The combined embedding generator 1004 generates an embedding. For example, the combined embedding generator 1004 receives a shadow removal request, and in response, the combined embedding generator 1004 performs segmentation on a digital image to obtain a mask. Specifically, the combined embedding generator 1004 obtains a mask of a foreground object in the digital image and generates a combined embedding from the mask and the input digital image. Further, in some embodiments, the combined embedding generator 1004 utilizes a combination layer or a concatenation layer to generate the combined embedding from the mask, the input digital image, and a latent noise representation.

In addition, the trained shadow removal denoising model 1006 processes a combined embedding thorough one or more denoising neural networks or denoising layers. For example, the trained shadow removal denoising model 1006 receives a combined embedding and denoises the combined embedding to generate a denoised representation. Further, the trained shadow removal denoising model 1006 further conditions a denoising neural network on a version of the input digital image (e.g., a downsampled or low-resolution version). Moreover, in some embodiments, the trained shadow removal denoising model 1006 generates a modified digital image in tandem with the modified digital image manager 1008.

The modified digital image manager 1008 works in tandem with the trained shadow removal denoising model 1006. For example, the modified digital image manager 1008 generates a modified digital image without a shadow occluding at least part of the foreground object and lighting properties of a foreground object harmonized with lighting properties of a background. For instance, the modified digital image manager 1008 oversees the conditioning of the trained shadow removal denoising model with a version of the input digital image to generate a denoised representation and further utilizes a decoder to generate the modified digital image from the denoised representation.

The fine-tuning manager 1010 performs fine-tuning on a pre-trained text-guided image generation model. For example, the fine-tuning manager 1010 first fine-tunes a pre-trained model to generate/optimize parameters for the background harmonization denoising model 1012. Furthermore, the fine-tuning manager 1010 then fine-tunes the background harmonization denoising model 1012 to generate/optimize parameters for the shadow removal denoising model 1014.

The storage manager 1016 stores one or more items generated by generative portrait shadow removal system 102. For example, the storage manager 1016 stores shadow removal requests, input digital images, masks, latent noise representations, modified digital images, and refined modified digital images. For instance, the storage manager 1016 further stores fine-tuning data, loss functions, training images, and curated image datasets.

Each of the components 1002-1016 of the generative portrait shadow removal system 102 can include software, hardware, or both. For example, the components 1002-1016 can include one or more instructions stored on a computer-readable storage medium and executable by processors of one or more computing devices, such as a client device or server device. When executed by the one or more processors, the computer-executable instructions of the generative portrait shadow removal system 102 can cause the computing device(s) to perform the methods described herein. Alternatively, the components 1002-1016 can include hardware, such as a special-purpose processing device to perform a certain function or group of functions. Alternatively, the components 1002-1016 of the generative portrait shadow removal system 102 can include a combination of computer-executable instructions and hardware.

Furthermore, the components 1002-1016 of the generative portrait shadow removal system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1016 of the generative portrait shadow removal system 102 may be implemented as a stand-alone application, such as a desktop or mobile application. Furthermore, the components 1002-1016 of the generative portrait shadow removal system 102 may be implemented as one or more web-based applications hosted on a remote server. Alternatively, or additionally, the components 1002-1016 of the generative portrait shadow removal system 102 may be implemented in a suite of mobile device applications or "apps." For example, in one or more embodiments, the generative portrait shadow removal system 102 can comprise or operate in connection with digital software applications such as ADOBE® EXPRESS, ADOBE® PHOTOSHOP®, PHOTOSHOP® EXPRESS, PHOTOSHOP® CC, and PHOTOSHOP® LIGHTROOM.

Figure 11:
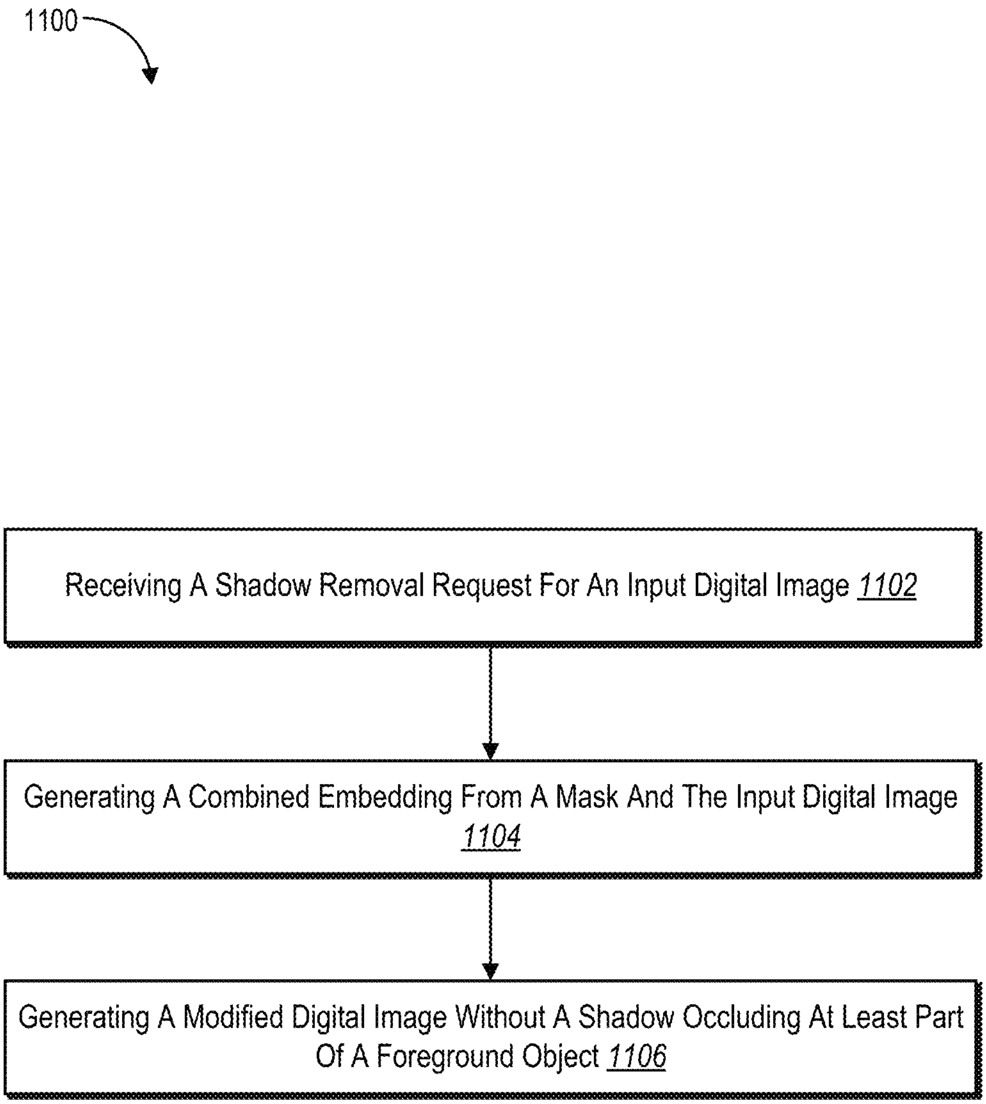
FIG. 11 illustrates a flowchart of a series of acts for generating a modified digital image without the shadow occluding at least part of the foreground object in accordance with one or more implementations.

FIGS. 1-10, the corresponding text, and the examples provide a number of different methods, systems, devices, and non-transitory computer-readable media of the 1002-1016. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for generating a modified digital image in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12 In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of receiving a shadow removal request for an input digital image. Further, the act 1104 includes an act of generating a combined embedding from a mask and the input digital image. Moreover, series of acts 1100 includes an act 1106 of generating a modified digital image without a shadow occluding at least part of a foreground object. In particular, the act 1102 includes receiving a shadow removal request for an input digital image comprising a foreground object with a shadow occluding at least part of the foreground object. Moreover, the act 1104 includes generating a combined embedding from a mask of the foreground object and the input digital image. Further, the act 1106 includes generating, from the combined embedding and by conditioning layers of a trained shadow removal denoising model with a version of the input digital image, a modified digital image without the shadow occluding at least part of the foreground object and lighting properties of the foreground object harmonized with lighting properties of a background of the input digital image.

For example, in one or more embodiments, the series of acts 1100 includes receiving a portrait of a subject as the foreground object and the shadow occluding at least part of the portrait of the subject is cast from at least one of an external object, an internal object, or from a self-occlusion by the portrait of the subject. In addition, in one or more embodiments, the series of acts 1100 includes receiving a latent noise representation. Further, in one or more embodiments, the series of acts 1100 includes generating, utilizing a segmentation model, the mask of the foreground object. Further, in some embodiments, the series of acts 1100 includes generating the combined embedding from the latent noise representation, the mask of the foreground object, and the input digital image.

Moreover, in one or more embodiments, the series of acts 1100 includes processing the combined embedding at a multi-channel input layer of the trained shadow removal denoising model. Moreover, in one or more embodiments, the series of acts 1100 includes generating, utilizing a denoising layer of the trained shadow removal denoising model, a denoising representation of the combined embedding by conditioning the denoising layer with the version of the input digital image. Further, in one or more embodiments, the series of acts 1100 includes generating a low-resolution version of the input digital image relative to an initial resolution of the input digital image.

Moreover, in one or more embodiments, the series of acts 1100 includes generating, utilizing an image encoder, an image embedding of the low-resolution version of the input digital image. Additionally, in one or more embodiments, the series of acts 1100 includes conditioning layers of the trained shadow removal denoising model with the image embedding of the low-resolution version of the input digital image. Moreover, in one or more embodiments, series of acts 1100 includes conditioning layers of the trained shadow removal denoising model with the version of the input digital image to capture an initial lighting distribution of a background of the input digital image. Further, in one or more embodiments, the series of acts 1100 includes generating, from the modified digital image and utilizing an upsampling model, a refined modified digital image comprising high-frequency details of the input digital image without the shadow occluding at least part of the foreground object and the lighting properties of the foreground object harmonized with the lighting properties of the background of the input digital image.

Furthermore, in one or more embodiments, the series of acts 1100 includes generating a combined embedding for background harmonization by combining a training mask of a first training foreground object, a first latent noise training representation, and an unharmonized digital image that includes lighting properties of the first training foreground object unharmonized with lighting properties of a background. Moreover, in one or more embodiments, the series of acts 1100 includes conditioning layers of the denoising model with a lighting map for the background. In one or more embodiments, the series of acts 1100 includes generating a harmonized digital image with the lighting properties of the first training foreground object harmonized with the lighting properties of the background.

Moreover, in one or more embodiments, the series of acts 1100 includes fine-tuning the background harmonization denoising model to generate the trained shadow removal denoising model. Further, in one or more embodiments, the series of acts 1100 includes generating a combined embedding for shadow removal by combining an additional training mask of a second training foreground object, a second training latent noise representation, and a training digital image with a shadow occlusion. Moreover, in one or more embodiments, the series of acts 1100 includes conditioning layers of the background harmonization denoising model with a downsampled version of the training digital image with the shadow occlusion. Further, in one or more embodiments, the series of acts 1100 includes generating a training modified digital image without the shadow occlusion and with lighting properties of the second training foreground object harmonized with lighting properties of a background of the training digital image.

In one or more embodiments, the series of acts 1100 includes receiving a shadow removal request for an input digital image comprising a foreground object with a shadow occluding at least part of the foreground object. Further, in one or more embodiments, the series of acts 1100 includes determining, from the input digital image, a version of the input digital image that indicates lighting properties of a background of the input digital image. Moreover, in one or more embodiments, the series of acts 1100 includes generating, from a mask of the foreground object and by conditioning layers of a trained shadow removal denoising model with the version of the input digital image, a modified digital image without the shadow occluding at least part of the foreground object and lighting properties of the foreground object harmonized with lighting properties of the background. Further, in one or more embodiments, the series of acts 1100 includes generating, from the modified digital image and utilizing an upsampling model, a refined modified digital image comprising high-frequency details of the input digital image without the shadow occluding at least part of the foreground object and the lighting properties of the foreground object harmonized with the lighting properties of the background.

Moreover, in one or more embodiments, the series of acts 1100 includes generating, utilizing a segmentation model, the mask of the foreground object. Further, in one or more embodiments, the series of acts 1100 generating the combined embedding from a latent noise representation, the mask of the foreground object, and the input digital image. Moreover, in one or more embodiments, the series of acts 1100 includes processing the combined embedding at a multi-channel input layer of the trained shadow removal denoising model to generate the modified digital image. Additionally, in one or more embodiments, the series of acts 1100 includes generating, utilizing a denoising layer of the trained shadow removal denoising model, a denoising representation of the combined embedding by conditioning the denoising layer with a downsampled version of the input digital image.

Moreover, in one or more embodiments, the series of acts 1100 includes generating, utilizing an image encoder, an image embedding of a low-resolution version of the input digital image relative to an initial resolution of the input digital image. Further, in one or more embodiments, the series of acts 1100 includes conditioning layers of the trained shadow removal denoising model with the image embedding of the low-resolution version of the input digital image. Moreover, in one or more embodiments, the series of acts 1100 generating harmonization digital images with lighting properties of a background in an image and lighting properties of a foreground object.

Further, in one or more embodiments, the series of acts 1100 includes generating externally caused occlusions within training digital images. In one or more embodiments, the series of acts 1100 includes generating internally caused occlusions within the training digital images. Further, in one or more embodiments, the series of acts 1100 includes generating synthetic training digital images with synthetically created occlusions. Moreover, in one or more embodiments, the series of acts 1100 includes generating additional training digital images without occlusions.

In one or more embodiments, the series of acts 1100 includes generating parameters of the trained shadow removal denoising model based on an image dataset comprising harmonization digital images, externally caused occlusions within training digital images, internally caused occlusions within the training digital images, synthetic training digital images, and additional training digital images without occlusions.

Further, in one or more embodiments, the series of acts 1100 includes generating, based on an input digital image with foreground lighting unharmonized with background lighting and a mask of a foreground object of the input digital image and utilizing a background harmonization denoising model, an output digital image with the foreground lighting of the foreground object harmonized with the background lighting. Moreover, in one or more embodiments, the series of acts 1100 includes generating, based on the input digital image with a shadow occluding at least part of the foreground object and utilizing the background harmonization denoising model, a modified digital image without the shadow occluding at least part of the foreground object and the foreground lighting harmonized with the background lighting. Further, in one or more embodiments, the series of acts 1100 includes generating parameters of a trained shadow removal denoising model from the background harmonization denoising model based on the output digital image with the foreground lighting of the foreground object harmonized with the background lighting and the modified digital image without the shadow.

Moreover, in one or more embodiments, the series of acts 1100 includes generating a combined embedding by combining the mask of the foreground object, the input digital image comprising lighting properties of the foreground object unharmonized with lighting properties of a background, and a latent noise representation. Further, in one or more embodiments, the series of acts 1100 includes conditioning layers of the background harmonization denoising model with a lighting map of the background lighting of the input digital image to generate the output digital image. In one or more embodiments, the series of acts 1100 includes generating parameters of the background harmonization denoising model based on the output digital image with the foreground lighting of the foreground object harmonized with the background lighting. Further, in one or more embodiments, the series of acts 1100 includes generating a combined embedding for shadow removal by combining the mask of the foreground object, a latent noise representation, and the input digital image. Moreover, in one or more embodiments, the series of acts 1100 includes conditioning layers of the background harmonization denoising model with a downsampled version of the input digital image. Further, in one or more embodiments, the series of acts 1100 includes generating parameters of the trained shadow removal denoising model from the background harmonization denoising model based on the combined embedding.

In one or more embodiments, the series of acts 1100 includes utilizing the trained shadow removal denoising model to generate a combined embedding from an additional mask of an additional foreground object and an additional input digital image. Further, in one or more embodiments, the series of acts 1100 includes generating, from the combined embedding and by conditioning layers of the trained shadow removal denoising model with a downsampled version of the additional input digital image, a modified digital image without a shadow occluding at least part of an additional foreground object and lighting properties of the additional foreground object harmonized with lighting properties of a background of the additional input digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
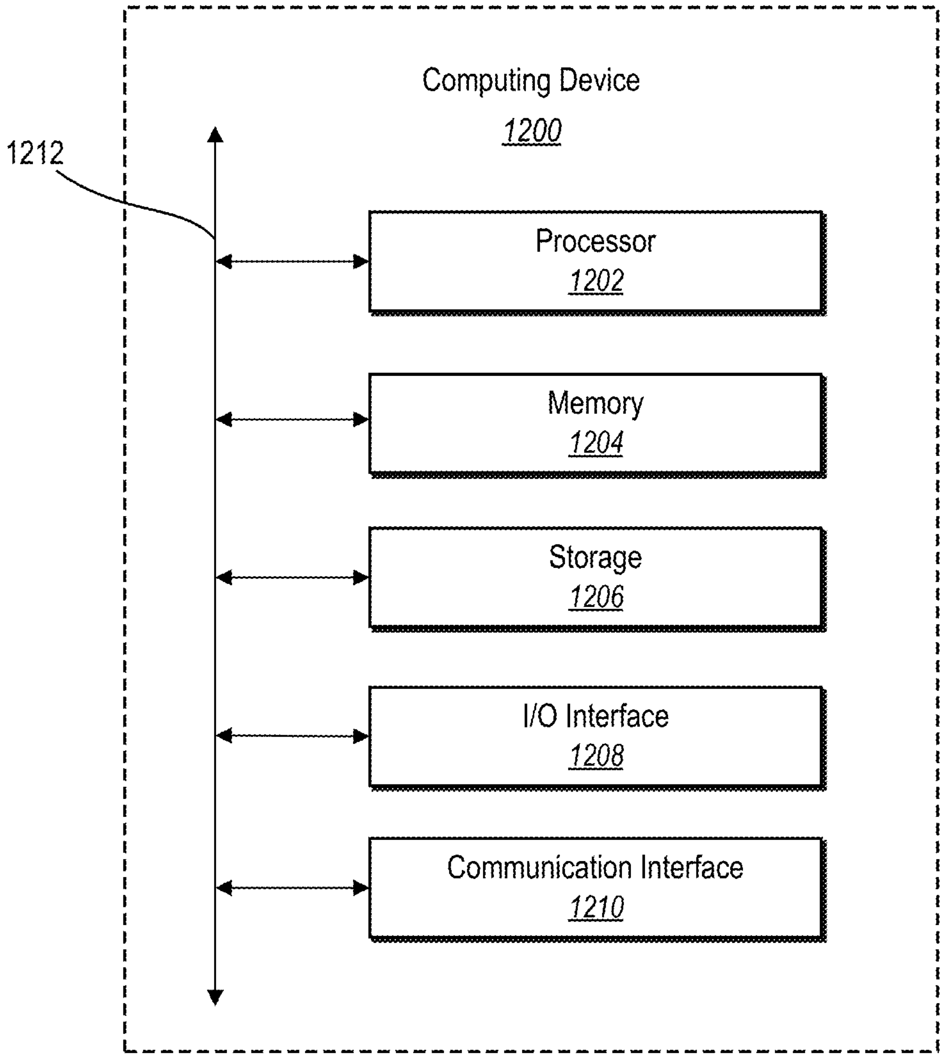
FIG. 12 illustrates a block diagram of an exemplary computing device in accordance with one or more implementations.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 104 and/or the client device 112). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 include hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause the at least one processor to perform operations comprising:

receiving a shadow removal request for an input digital image comprising a foreground object with a shadow occluding at least part of the foreground object;

generating a combined embedding from a mask of the foreground object and the input digital image; and generating, from the combined embedding and by conditioning layers of a trained shadow removal denoising model with a version of the input digital image, a modified digital image without the shadow occluding at least part of the foreground object and lighting properties of the foreground object harmonized with lighting properties of a background of the input digital image.

2. The non-transitory computer-readable medium of claim 1, wherein receiving the shadow removal request further comprises receiving a portrait of a subject as the foreground object and the shadow occluding at least part of the portrait of the subject is cast from at least one of an external object, an internal object, or from a self-occlusion by the portrait of the subject.

3. The non-transitory computer-readable medium of claim 1, wherein generating the combined embedding further comprises:

receiving a latent noise representation;

generating, utilizing a segmentation model, the mask of the foreground object; and generating the combined embedding from the latent noise representation, the mask of the foreground object, and the input digital image.

4. The non-transitory computer-readable medium of claim 3, further comprising:

processing the combined embedding at a multi-channel input layer of the trained shadow removal denoising model; and generating, utilizing a denoising layer of the trained shadow removal denoising model, a denoising representation of the combined embedding by conditioning the denoising layer with the version of the input digital image.

5. The non-transitory computer-readable medium of claim 1, wherein conditioning layers of the trained shadow removal denoising model utilizing the version of the input digital image comprises:

generating a low-resolution version of the input digital image relative to an initial resolution of the input digital image;

generating, utilizing an image encoder, an image embedding of the low-resolution version of the input digital image; and conditioning layers of the trained shadow removal denoising model with the image embedding of the low-resolution version of the input digital image.

6. The non-transitory computer-readable medium of claim 1, wherein generating the modified digital image comprises conditioning layers of the trained shadow removal denoising model with the version of the input digital image to capture an initial lighting distribution of a background of the input digital image.

7. The non-transitory computer-readable medium of claim 1, further comprising generating, from the modified digital image and utilizing an upsampling model, a refined modified digital image comprising high-frequency details of the input digital image without the shadow occluding at least part of the foreground object and the lighting properties of the foreground object harmonized with the lighting properties of the background of the input digital image.

8. The non-transitory computer-readable medium of claim 1, further comprising fine-tuning a denoising model to generate background harmonization denoising model by:

generating a combined embedding for background harmonization by combining a training mask of a first training foreground object, a first latent noise training representation, and an unharmonized digital image that includes lighting properties of the first training foreground object unharmonized with lighting properties of a background;

conditioning layers of the denoising model with a lighting map for the background; and generating a harmonized digital image with the lighting properties of the first training foreground object harmonized with the lighting properties of the background.

9. The non-transitory computer-readable medium of claim 8, further comprising fine-tuning the background harmonization denoising model to generate the trained shadow removal denoising model by:

generating a combined embedding for shadow removal by combining an additional training mask of a second training foreground object, a second training latent noise representation, and a training digital image with a shadow occlusion;

conditioning layers of the background harmonization denoising model with a downsampled version of the training digital image with the shadow occlusion; and generating a training modified digital image without the shadow occlusion and with lighting properties of the second training foreground object harmonized with lighting properties of a background of the training digital image.

10. A system comprising:

at least one processor; and at least one memory device coupled to the at least one processor that causes the system to:

receive a shadow removal request for an input digital image comprising a foreground object with a shadow occluding at least part of the foreground object;

determine, from the input digital image, a version of the input digital image that indicates lighting properties of a background of the input digital image;

generate, from a mask of the foreground object and by conditioning layers of a trained shadow removal denoising model with the version of the input digital image, a modified digital image without the shadow occluding at least part of the foreground object and lighting properties of the foreground object harmonized with lighting properties of the background; and generate, from the modified digital image and utilizing an upsampling model, a refined modified digital image comprising high-frequency details of the input digital image without the shadow occluding at least part of the foreground object and the lighting properties of the foreground object harmonized with the lighting properties of the background.

11. The system of claim 10, wherein the at least one processor further causes the system to generate a combined embedding by:

generating, utilizing a segmentation model, the mask of the foreground object;

generating the combined embedding from a latent noise representation, the mask of the foreground object, and the input digital image; and processing the combined embedding at a multi-channel input layer of the trained shadow removal denoising model to generate the modified digital image.

12. The system of claim 11, wherein the at least one processor further causes the system to generate, utilizing a denoising layer of the trained shadow removal denoising model, a denoising representation of the combined embedding by conditioning the denoising layer with a downsampled version of the input digital image.

13. The system of claim 10, wherein the at least one processor further causes the system to condition layers of the trained shadow removal denoising model by:

generating, utilizing an image encoder, an image embedding of a low-resolution version of the input digital image relative to an initial resolution of the input digital image; and conditioning layers of the trained shadow removal denoising model with the image embedding of the low-resolution version of the input digital image.

14. The system of claim 10, wherein the at least one processor further causes the system to fine-tune a shadow removal denoising model by:

generating harmonization digital images with lighting properties of a background in an image and lighting properties of a foreground object;

generating externally caused occlusions within training digital images; and generating internally caused occlusions within the training digital images.

15. The system of claim 10, wherein the at least one processor further causes the system to fine-tune a shadow removal denoising model by:

generating synthetic training digital images with synthetically created occlusions; and generating additional training digital images without occlusions.

16. The system of claim 10, wherein the at least one processor further causes the system to generate parameters of the trained shadow removal denoising model based on an image dataset comprising harmonization digital images, externally caused occlusions within training digital images, internally caused occlusions within the training digital images, synthetic training digital images, and additional training digital images without occlusions.

17. A computer-implemented method comprising:

generating, based on an input digital image with foreground lighting unharmonized with background lighting and a mask of a foreground object of the input digital image and utilizing a background harmonization denoising model, an output digital image with the foreground lighting of the foreground object harmonized with the background lighting;

generating, based on the input digital image with a shadow occluding at least part of the foreground object and utilizing the background harmonization denoising model, a modified digital image without the shadow occluding at least part of the foreground object and the foreground lighting harmonized with the background lighting; and generating parameters of a trained shadow removal denoising model from the background harmonization denoising model based on the output digital image with the foreground lighting of the foreground object harmonized with the background lighting and the modified digital image without the shadow.

18. The computer-implemented method of claim 17, further comprising:

generating a combined embedding by combining the mask of the foreground object, the input digital image comprising lighting properties of the foreground object unharmonized with lighting properties of a background, and a latent noise representation;

conditioning layers of the background harmonization denoising model with a lighting map of the background lighting of the input digital image to generate the output digital image; and generating parameters of the background harmonization denoising model based on the output digital image with the foreground lighting of the foreground object harmonized with the background lighting.

19. The computer-implemented method of claim 17, further comprising:

generating a combined embedding for shadow removal by combining the mask of the foreground object, a latent noise representation, and the input digital image;

conditioning layers of the background harmonization denoising model with a downsampled version of the input digital image; and generating parameters of the trained shadow removal denoising model from the background harmonization denoising model based on the combined embedding.

20. The computer-implemented method of claim 17, further comprising:

utilizing the trained shadow removal denoising model to generate a combined embedding from an additional mask of an additional foreground object and an additional input digital image; and generating, from the combined embedding and by conditioning layers of the trained shadow removal denoising model with a downsampled version of the additional input digital image, a modified digital image without a shadow occluding at least part of an additional foreground object and lighting properties of the additional foreground object harmonized with lighting properties of a background of the additional input digital image.

* * * * *